US011082432B2

(12) United States Patent
Kounavis et al.

(10) Patent No.: US 11,082,432 B2
(45) Date of Patent: Aug. 3, 2021

(54) METHODS AND APPARATUS TO SUPPORT RELIABLE DIGITAL COMMUNICATIONS WITHOUT INTEGRITY METADATA

(71) Applicant: Intel Corporation, Santa Clara, CA (US)

(72) Inventors: Michael Kounavis, Portland, OR (US); Amitabh Das, Hillsboro, OR (US); Sergej Deutsch, Hillsboro, OR (US); Karanvir S. Grewal, Hillsboro, OR (US); David M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 680 days.

(21) Appl. No.: 15/831,633

(22) Filed: Dec. 5, 2017

(65) Prior Publication Data
US 2019/0044954 A1  Feb. 7, 2019

(51) Int. Cl.
*H04L 29/06* (2006.01)
*H04L 9/06* (2006.01)

(52) U.S. Cl.
CPC .......... *H04L 63/123* (2013.01); *H04L 9/0631* (2013.01); *H04L 63/0428* (2013.01); *H04L 63/0435* (2013.01)

(58) Field of Classification Search
None
See application file for complete search history.

(56) References Cited

U.S. PATENT DOCUMENTS 7,657,756 B2 * 2/2010 Hall ................. G06F 12/0875
   713/189
8,340,295 B2 * 12/2012 Michaels ............. H04L 9/001
   380/263

(Continued)

FOREIGN PATENT DOCUMENTS

WO     2017112282    6/2017

OTHER PUBLICATIONS

U.S. Appl. No. 15/848,962, filed Dec. 20, 2017, entitled "Methods and Arrangements for Implicit Integrity", by Michael Kounavis, et al.

(Continued)

*Primary Examiner* — Maung T Lwin
(74) *Attorney, Agent, or Firm* — Trop, Pruner & Hu, P.C.

(57) ABSTRACT

Before sending a message to a destination device, a source device automatically uses a pattern matching algorithm to analyze entropy characteristics of a plaintext version of the message. The pattern matching algorithm uses at least one pattern matching test to generate at least one entropy metric for the message. The source device automatically determines whether the message has sufficiently low entropy, based on results of the pattern matching algorithm. In response to a determination that the message does not have sufficiently low entropy, the source device automatically generates integrity metadata for the message and sends the integrity metadata to the destination device. However, in response to a determination that the message has sufficiently low entropy, the source device sends the message to the destination device without sending any integrity metadata for the message to the destination device. Other embodiments are described and claimed.

13 Claims, 11 Drawing Sheets

(56) References Cited

U.S. PATENT DOCUMENTS

| | | | | |
|---|---|---|---|---|
| 8,687,810 B2 * | 4/2014 | Bukshpun | .................. | H04L 9/14 380/263 |
| 8,868,919 B2 * | 10/2014 | Barton | ..................... | G06F 21/36 713/182 |
| 9,213,653 B2 | 12/2015 | Durham et al. | | |
| 2005/0031120 A1 * | 2/2005 | Samid | ................... | H04L 9/0838 380/28 |
| 2005/0076209 A1 * | 4/2005 | Proudler | ............. | G06F 21/6227 713/165 |
| 2007/0230694 A1 * | 10/2007 | Rose | ..................... | H04L 9/0662 380/46 |
| 2012/0144205 A1 * | 6/2012 | Shu | ......................... | G06F 21/85 713/189 |
| 2013/0073598 A1 * | 3/2013 | Jacobson | ................ | H03M 7/30 708/252 |
| 2014/0223197 A1 * | 8/2014 | Gueron | ................... | G06F 21/72 713/193 |
| 2015/0161059 A1 * | 6/2015 | Durham | .............. | G06F 12/0868 713/193 |
| 2016/0254905 A1 | 9/2016 | Durham et al. | | |
| 2017/0285976 A1 | 10/2017 | Durham et al. | | |
| 2018/0337782 A1 * | 11/2018 | Wu | .......................... | H04L 9/14 |

OTHER PUBLICATIONS

Wikipedia, "Threefish", https://en.wikipedia.org/wiki/Threefish, accessed Oct. 31, 2017, four pages.

"Announcing the Advanced Encryption Standard (AES)", Federal Information Processing Standards Publication 197, Nov. 26, 2001, 51 pages.

Hall, et al., " Building PRFs from PRPs", CRYPTO '98 Proceedings of the 18th Annual International Cryptology Conference on Advances in Cryptology; Aug. 23-27, 1998, pp. 370-389.

Wikipedia, "Disk Encryption Theory", https://en.wikipedia.org/wiki/Disk_encryption_theory, accessed Nov. 2, 2017, six pages.

Nordic Semiconductor, "ECB-AES Electronic Codebook Mode Encryption", http://infocenter.nordicsemi.com/index.jsp?topic=%2Fcom.nordic.infocenter.nrf52832.ps.v1.1%2Fecb.html, accessed Oct. 18, 2017, five pages.

Dworkin, "Recommendation for Block Cipher Modes of Operation, Methods and Techniques"; NIST Special Publication 800-38A; 2001 Edition, Dec. 2001, 66 pages.

* cited by examiner

METHODS AND APPARATUS TO SUPPORT RELIABLE DIGITAL COMMUNICATIONS WITHOUT INTEGRITY METADATA

TECHNICAL FIELD

The present disclosure pertains in general to data processing systems and in particular to methods and apparatus to support reliable digital communications without integrity metadata.

BACKGROUND

In the field of data processing, it is not unusual for data processing systems to communicate with each other. For instance, a user at one data processing system may send an email message to a user at another data processing system, or a user at a client device may download data from server. Since such digital communications are susceptible to corruption, it is common for devices to use integrity metadata when communicating. For instance, when a source device prepares to send a message to a destination device, the source device may generate integrity metadata for the message and include the integrity metadata with the message when sending the message to the destination device. The destination device may then use the integrity metadata to determine whether the message was corrupted in transit.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

Figure 1:
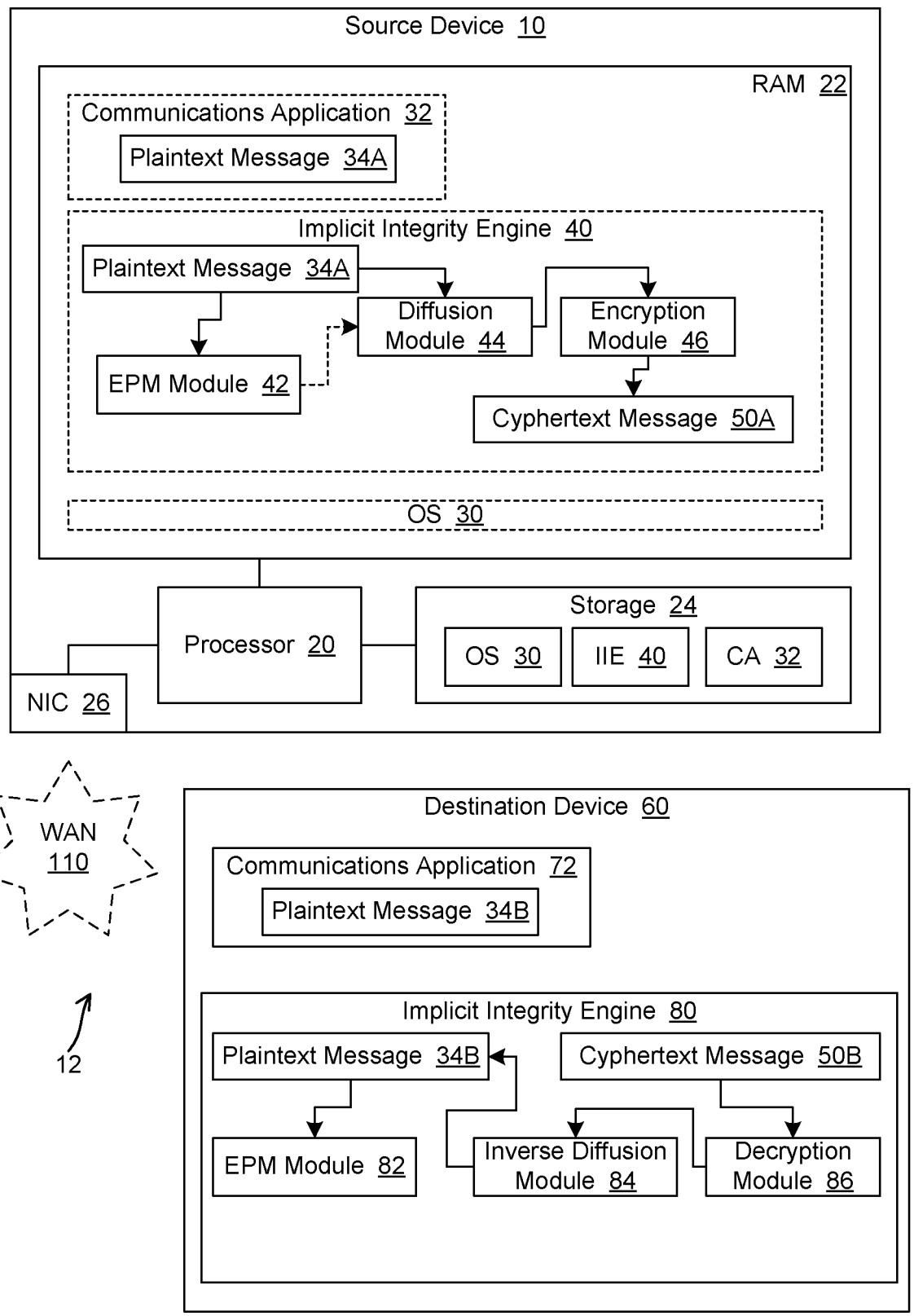
FIG. 1 is a block diagram of an example embodiment of a data processing environment that includes data processing systems with implicit integrity engines.

As suggested above, when a source device uses a conventional communication protocol to send a digital message to a destination device, the protocol may require the source device to generate integrity metadata for the message and to transmit the integrity metadata to the destination device with the message. The destination device may then use the integrity metadata from the source device to determine whether the message was corrupted in transit. For purposes of this disclosure, integrity metadata may be referred to as an "integrity check value" or "ICV." An ICV may include, for instance, one or more of the following types of data: a checksum, a message authentication code (MAC), a cyclic redundancy check (CRC), or any other suitable metadata about the message payload to enable the receiving device to determine, based on that metadata, whether or not the message payload has been corrupted.

Additionally, data processing systems frequently use encryption and decryption to protect digital communications. For example, a source device may encrypt a plaintext message into a ciphertext message and then send the ciphertext message to a destination device. The destination device may then decrypt the ciphertext message into the plaintext message. However, if the ciphertext message is at all corrupted in transit, the destination device will receive a ciphertext message that is different from the original ciphertext message. A conventional destination device may use integrity metadata to determine whether the received ciphertext message has been corrupted. If a destination device attempts to decrypt corrupted ciphertext, the resulting plaintext message will be different from the original plaintext message. For purposes of this disclosure, a plaintext message that is generated by deciphering a corrupted ciphertext message may be referred to as a "corrupted plaintext message" or simply "corrupted plaintext."

The present disclosure pertains to methods and apparatus to support reliable digital communications without integrity metadata. In particular, as described in greater detail below, the present disclosure describes methods and apparatus which reduce or eliminate the need for a source device to generate integrity metadata and send the integrity metadata to a destination device. The described methods and apparatus also reduce or eliminate the need for a destination device to generate and verify integrity metadata. Instead, the source devices and destination devices may use techniques that provide for implicit integrity. Such techniques for providing data integrity may be implemented as part of networking and network security protocols. Consequently, the techniques described herein may allow devices and networks to avoid consuming network bandwidth with integrity metadata, which may substantially improve the utilization of the network infrastructure.

For purposes of this disclosure, the term "implicit integrity" refers to a process or technology which makes determinations concerning the integrity of a message based on at least one entropy characteristic of that message. Also, the term "entropy" refers to the degree of disorder, randomness, or uncertainty in a message. In one embodiment, a source device starts with a plaintext message that has low entropy, in that the message exhibits one or more patterns. Accordingly, it is possible to distinguish that message from random data, based on evaluation of the entropy. The source device then converts the plaintext message into ciphertext using an encryption technique or algorithm with certain characteristics. One of those characteristics may be that the encryption technique produces ciphertext that is not distinguishable from random data. For instance, the encryption algorithm may approximate a random oracle. And since decryption is the inverse operation of encryption, the decryption algorithm may also approximate a random oracle. Consequently, a corrupted plaintext message may be indistinguishable from random data.

Another characteristic of the encryption technique pertains to the corresponding decryption technique for converting the ciphertext back into the plaintext message. In particular, the encryption technique may require a decryption technique which generates plaintext that is indistinguishable from random data if the ciphertext that is decrypted does not exactly match the ciphertext that was generated by the source device. For instance, the decryption technique may produce a so-called "avalanche effect," in that even a single bit change in the ciphertext affects all bits of the decrypted plaintext. Consequently, a destination device may reliably determine whether a ciphertext message has been corrupted by checking the entropy of the decrypted plaintext result of a decryption operation, as described in greater detail below. And as indicated above, processes and technologies which make determinations concerning the integrity of a decrypted message based on at least one entropy characteristic of that message may be referred to as using "implicit integrity." For instance, as described in greater detail below, source devices and destination devices may use implicit integrity engines to reliably share messages without including integrity metadata in some or all of those messages. Additionally, as described in greater detail below, an implicit integrity engine may use an extended pattern matching (EPM) module to make entropy evaluations.

FIG. 1 is a block diagram of an example embodiment of a data processing environment 12 that includes data processing systems with implicit integrity engines. Data processing environment 12 also includes one or more networks which enable the data processing systems to communicate with each other. Those networks may include, for instance, a wide area network (WAN) 110, a local area network (LAN), a personal area network (PAN), a mesh network, or any other suitable type of network or combination of networks.

For purposes of illustration, one data processing system is described as a source device 10, and the other is described as destination device 60. Source device 10 has various hardware components, such as a processor 20 communicatively coupled to various other components via one or more system buses or other communication pathways or mediums. For instance, source device 10 includes random access memory (RAM) 22, nonvolatile storage 24, and a network interface controller (NIC) 26 responsive to processor 20. Storage 24 may include various software components, such as an operating system (OS) 30, a communications application (CA) 32, and an implicit integrity engine 40. CA 32 may be an email application, a web browser, or any other suitable type of communications application. Processor 20 may copy software components into RAM 22 for execution.

Destination device 60 may include the same components or similar kinds of components as source device 10. For instance, destination device 60 may include at least one processor, RAM, nonvolatile storage, and a NIC, and destination device may copy a communications application 72 and an implicit integrity engine 80 from the nonvolatile storage to the RAM for execution. Additionally, the components in source device 10 may also enable source device 10 to operate as a destination device, and the components in destination device 60 may enable destination device 60 to operate as a source device.

However, for clarity, certain components for generating and transmitting messages are depicted in source device 10, while certain components for receiving and validating messages are depicted in destination device 60. For instance, a diffusion module 44 and an encryption module 46 are illustrated within implicit integrity engine 40 in source device 10, while implicit integrity engine 80 in destination device 60 is depicted as including an inverse diffusion module 84 and a decryption module 86. Implicit integrity engine 40 also includes an EPM module 42, and implicit integrity engine 80 includes an EPM module 82. However, implicit integrity engine 40 may also include an inverse diffusion module and a decryption module, and implicit integrity engine 80 may also include a diffusion module and an encryption module.

In each device, the implicit integrity engine may execute on top of the OS, and the communications application may execute on top of the implicit integrity engine. As described in greater detail below, when the communications application is ready to send a message to a destination device, the message first goes to the implicit integrity engine. When the implicit integrity engine receives the message, the implicit integrity engine uses an EPM module to determine whether the entropy of the message is sufficiently low for transmission with implicit integrity. In response to a positive determination, a diffusion module diffuses the message into a diffused message. The implicit integrity engine then uses an encryption module to encrypt the diffused message into a ciphertext message. Also, as described below, the implicit integrity engine may set a flag in the packet for the ciphertext message to indicate that implicit integrity is being used. The source device may then send the ciphertext message to the destination device via a WAN, a LAN, or any other suitable network or combination of networks. When the destination device receives the ciphertext message, an implicit integrity engine in the destination device may check the flag to determine whether the ciphertext message was sent with implicit integrity. In response to a positive determination, the implicit integrity engine may use a decryption module to convert the ciphertext message into a diffused message and an inverse diffusion module to convert that diffused message into a plaintext message. The implicit integrity engine may then use an EPM module to analyze the entropy of the plaintext message, to determine whether its entropy is sufficiently low to conclude that the message was not corrupted in transit. If the message was not corrupted, the plaintext message at the destination device should match the plaintext message that was sent by the source device.

Referring again to FIG. 1, in the illustrated embodiment, communications application 32 uses implicit integrity engine 40 to convert a plaintext message 34A into a ciphertext message 50A, as described in greater detail below. Also, implicit integrity engine 40 uses EPM module 42 to evaluate the entropy of plaintext message 34A. Communications application 32 then sends ciphertext message 50A to destination device 60. For instance, communications application 32 may send ciphertext message 50A as the payload of a packet. Communications application 72 in destination device 60 then receives ciphertext message 50B; and if the ciphertext message was not corrupted in transit, ciphertext message 50B will match ciphertext message 50A. Communications application 72 then uses implicit integrity engine 80 to convert ciphertext message 50B into plaintext message 34B. Implicit integrity engine 80 then uses EPM module 82 to determine whether the ciphertext message was corrupted, based on the entropy of plaintext message 34B. If the ciphertext message was not corrupted in transit, plaintext message 34B will match plaintext message 34A.

According to the present disclosure, one primary component of an implicit integrity engine is a set of algorithms which can detect the presence of patterns in a given sequence of bits. That sequence of bits may be referred to as the "input communication data," the "subject content," the "message," etc. In implicit integrity engine 40, that set of algorithms is implemented as EPM module 42. Likewise, in implicit integrity engine 80, that set of algorithms is implemented as EPM module 82. Additional details on the EPM modules are provided below.

According to the present disclosure, another primary component of an implicit integrity engine is a set of cryptographic constructions which fully diffuse each bit of the plaintext input to all bits of the cryptographic output for encryption, and which perform the inverse of that diffusion for decryption. In other words, even a single bit change in the input affects all bits of the output. In implicit integrity engine 40, the cryptographic technology for fully diffusing each bit of the plaintext input to all bits of the cryptographic output is implemented as diffusion module 44. And in implicit integrity engine 80, the technology for performing the inverse of that diffusion is implemented as inverse diffusion module 84. In addition or alternatively, an implicit integrity engine may use an encryption module to fully diffusing each bit of the plaintext input to all bits of the cryptographic output and a decryption module to perform the inverse of that diffusion. Additional details on diffusion modules and such are provided further below.

Figure 2:
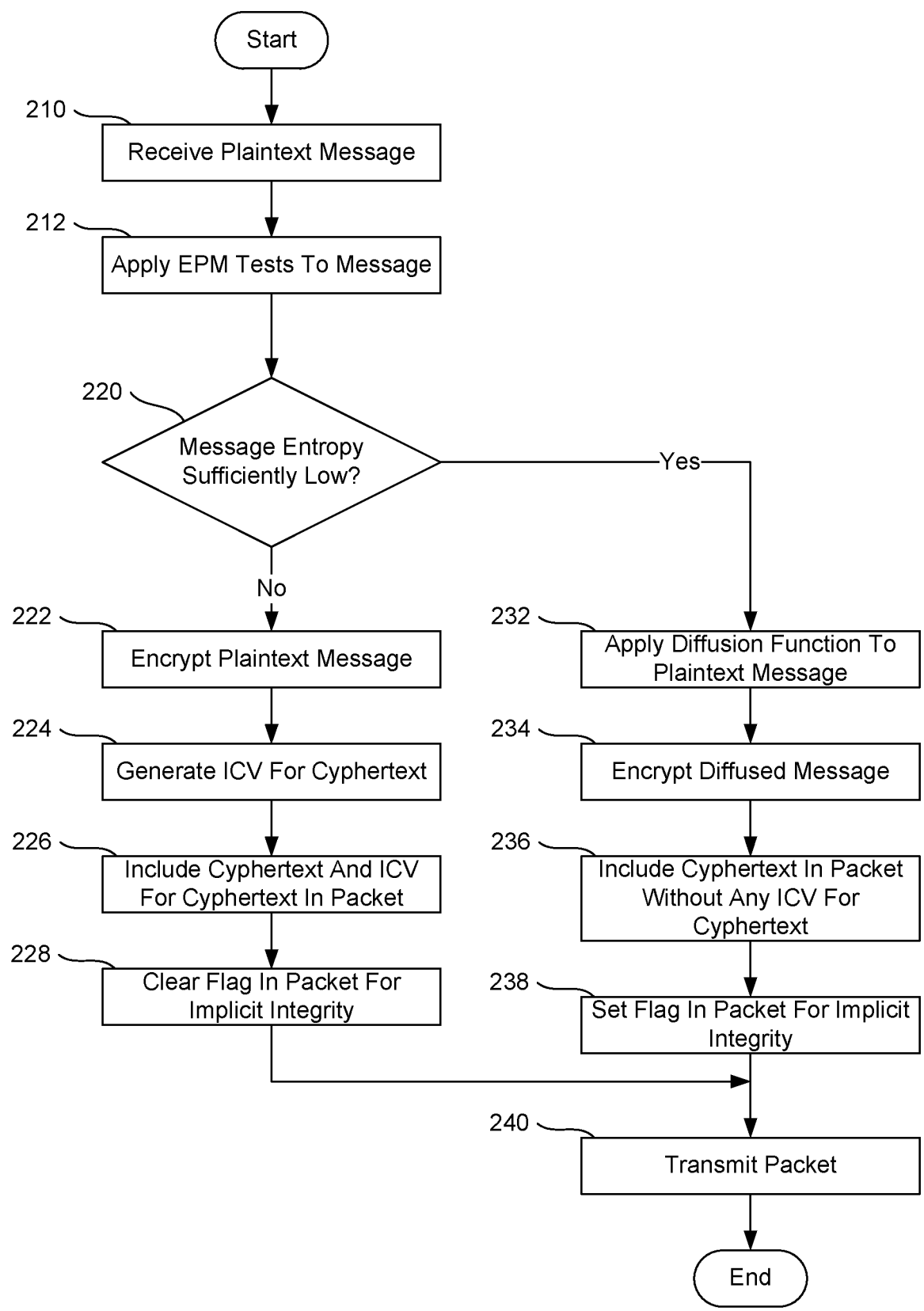
FIG. 2 presents a flowchart of an example embodiment of a process for using an implicit integrity engine to generate an outgoing message.

FIG. 2 presents a flowchart of an example embodiment of a process for using implicit integrity engine 40 to generate an outgoing message such as ciphertext message 50A. That process may start at block 210 with implicit integrity engine 40 receiving plaintext message 34A from communications application 32. As shown at block 212, implicit integrity engine 40 may then use EPM module 42 to evaluate the entropy of plaintext message 34A.

In particular, EPM module 42 determines whether any detected patterns in the message correspond to an entropy level which is low enough so as to allow for protection of the message to be supported via implicit integrity while still providing sufficiently reliable corruption detection. In other words, EPM module 42 determines whether the entropy of the subject content (e.g., plaintext message 34A) is low enough to enable devices which obtain that subject content via network communications (and via decryption) to safely deduce that the subject content has not been corrupted.

Figure 3:
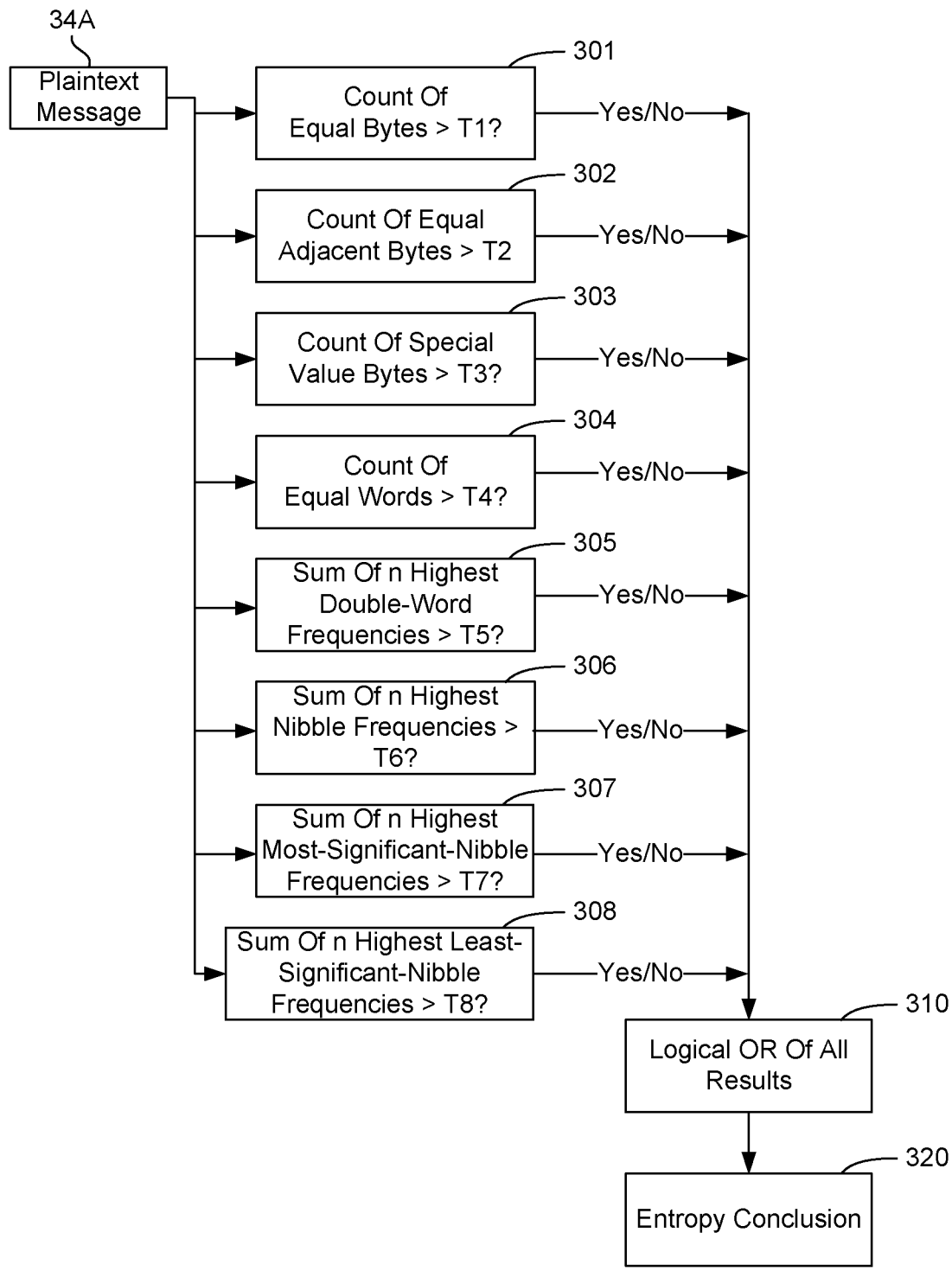
FIGS. 3 and 4 are flow diagrams illustrating example embodiments of processes for using pattern matching algorithms to evaluate the entropy of messages.
Figure 4:
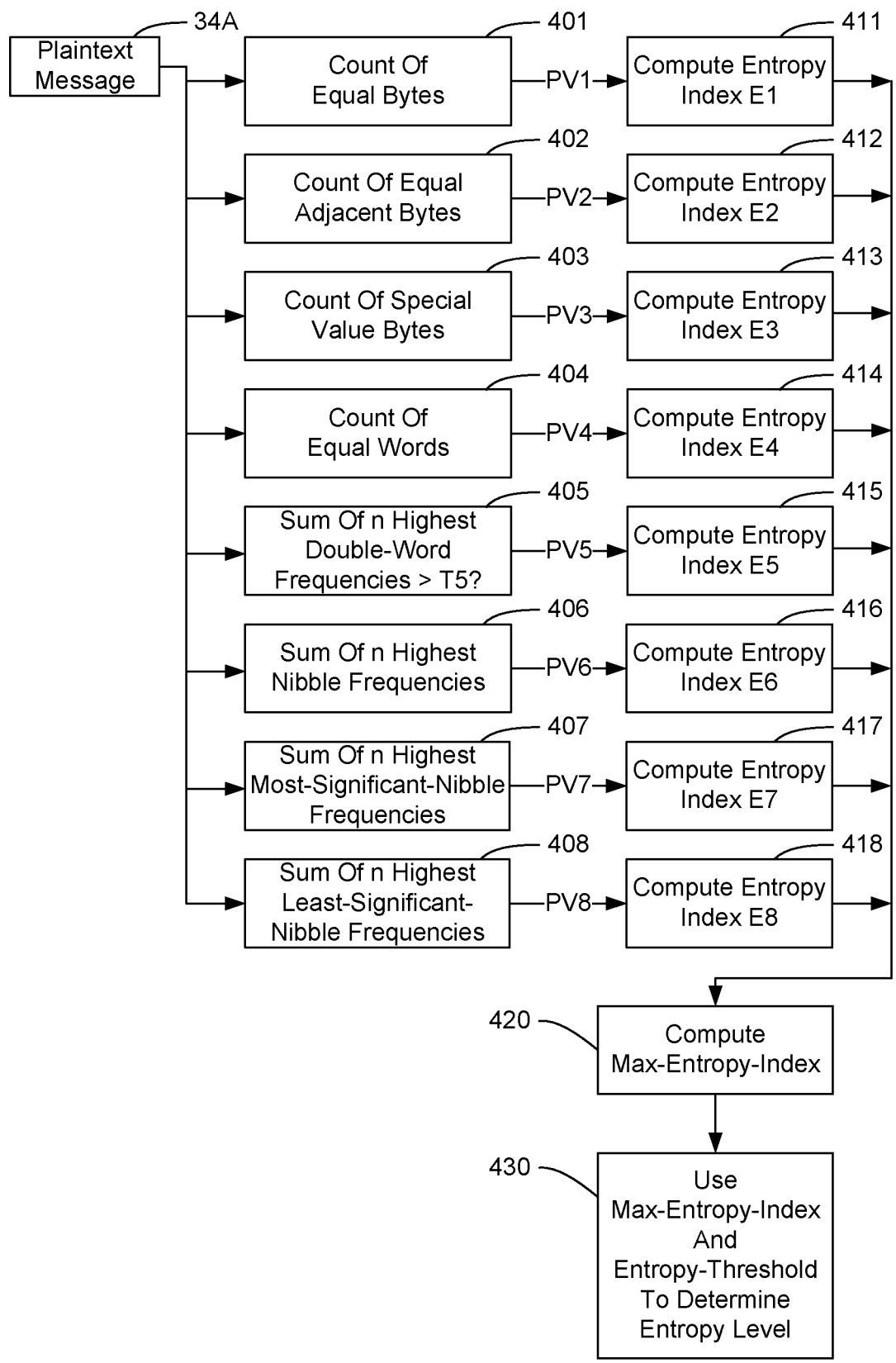

FIGS. 3 and 4 are flow diagrams illustrating example embodiments of processes for using pattern matching algorithms to evaluate the entropy of messages. The techniques illustrated in FIGS. 3 and 4 may be referred to as "advanced" or "extended" because they employ multiple different styles or types of pattern checks or pattern detectors. Accordingly, pattern matching algorithms like those illustrated in FIGS. 3 and 4 may also be referred to as "advanced pattern techniques for implicit integrity," and those techniques may be used to perform EPM. As indicated below, in other embodiments or scenarios, other types of pattern detectors and other combinations of pattern detectors may be used to support implicit integrity. Accordingly, the pattern checks of FIGS. 3 and 4 should be understood as an example family of patterns checks, and different families may be employed in other embodiments or scenarios. For instance, other embodiments or scenarios may use pattern checks which count how many double words take special values, which count how many adjacent words contain the same value, which determine a sum of n byte frequencies being higher than a threshold, etc.

Also, different pattern checks may use different types or sizes of entities when analyzing a message. For instance, entities can be 4-bit nibbles, bytes (as illustrated in blocks 301 and 401), 16-bit words (as illustrated in blocks 304 and 404), or 32-bit double words (as illustrated in blocks 305 and 405), for instance.

In the examples of FIGS. 3 and 4, one type of pattern check detects entities among the subject content that are equal to each other. In other words, the pattern check determines how many entities in the message contain the same substantive value. The number of entities in a message that contain the same substantive value may also be referred to as the "value count" or the "frequency" for that substantive value. Furthermore, the set of value counts for a message may be referred to as the "value histogram" for that message. Accordingly, the value histogram for a message is a set of value counts, with each count indicating how many entities of a predetermined size in the message contain a particular substantive value.

Another style of pattern check concerns entities among the message which are not only equal to each other, but are also placed in consecutive/adjacent positions within the message (as illustrated in blocks 302 and 402). This second type of pattern check is not necessarily the same as the first one. For example, an EPM module can associate these two types of pattern checks with different entropy thresholds and, by doing so, build two different pattern detectors.

Yet another type of pattern check detects entities that contain special values (as illustrated in blocks 303 and 403). Special values are specific values from a predetermined set of values. For instance, a set of special values may be populated with values that are (a) frequently encountered in regular user data but (b) infrequently encountered in random or corrupted plaintext data. For example, in many different types of user data, a high percentage of bytes take the values of zero (0x00) or sixteen (0xFF).

Another type of pattern check detects entities the value histogram of which demonstrates a sum of n highest value counts (i.e., frequencies) being higher than a predetermined entropy threshold. In one particular example, a pattern detector may use n=2, an entity width of 4 bits (a nibble), and a message width of 512 bits. Thus, the 512 bits of input data includes (512/4=) 128 nibbles. When analyzing the content of those nibbles, an EPM module may determine that the two most-frequently-occurring nibble values in the input data are 16 (which occurs 40 times) and 0 (which occurs 20 times). Consequently, the sum of the two highest value counts is (40+20=) 60. And if the corresponding entropy threshold is 40 for instance, then the pattern check would conclude that entropy is low, since 60 exceeds 40.

By checking whether the sum of the two highest nibble frequencies exceeds an entropy threshold, a more flexible pattern detector can be built, which on the one hand encompasses significantly more regular user inputs, and on the other hand is associated with an event or attribute that is infrequent among random data. This type of pattern check may be effective for evaluating input messages which have content that is not as random as that of encrypted data, but which also do not demonstrate patterns at the byte or word granularity. One example of such content is media data, where nibble values may be replicated, but the data may not demonstrate significant byte or word replications. A pattern check that determines whether the sum of the n highest nibble frequencies exceeds an entropy threshold may efficiently and effectively recognize a relatively low entropy for this type of data. Blocks 306-308 illustrate pattern checks of that type, and blocks 406-408 illustrate similar pattern checks.

In particular, FIG. 3 illustrates EPM using entropy threshold values, while FIG. 4 illustrates EPM using entropy index values. In one embodiment, EPM modules 42 and 82 use the pattern checks shown in FIG. 3. In another embodiment, EPM modules 42 and 82 use the pattern checks shown in FIG. 4. In other embodiments, EPM modules may use one or more of the pattern checks shown in FIG. 3 or 4, or one or more similar types of pattern checks.

In the embodiments shown in FIGS. 3 and 4, the EPM module uses eight pattern checks. In both embodiments, the following computations are performed:
1. compute the maximum number of bytes that are equal (as shown in blocks 301 and 401);
2. compute the maximum number of adjacent bytes that are equal (as shown in blocks 302 and 402);
3. compute the maximum number of bytes that have special values from a set SV (as shown in blocks 303 and 403);
4. compute the maximum number of words that are equal (as shown in blocks 304 and 404);
5. compute the sum of the n highest double-word-value frequencies (as shown in blocks 305 and 405);
6. compute the sum of the n highest nibble-value frequencies (as shown in blocks 306 and 406);
7. considering only nibbles in the most significant half of each byte, compute the sum of the n highest most-significant-nibble-value frequencies (as shown in blocks 307 and 407);
8. considering only nibbles in the least significant half of each byte, compute the sum of the n highest least-significant-nibble-value frequencies (as shown in blocks 308 and 408).

For example, with regard to block 305, if n is two, the EPM module may use the following operations to compute the sum of the two highest double-word-value frequencies: (a) considering all double words, determine which double-word value occurs most frequently and which double-word value occurs next-most frequently, (b) count how many double words contain the value that occurs most frequently, (c) count how many double words contain the value that occurs next-most frequently, and (d) sum those two counts to compute the sum of the two highest double-word-value frequencies (which may also be referred to as "the sum of two highest double-word frequencies").

In the embodiment of FIG. 3, the resulting numbers are compared against corresponding entropy thresholds T1-T8, and the results form a vector of eight Boolean values. As shown at block 310, these Boolean values undergo a logical OR operation. As shown at block 320, the result of this logical OR operation is the final determination or conclusion as to whether or not the message has low entropy. Thus, the algorithm of FIG. 3 checks whether there exists at least one pattern check from among the set employed, according to which the observed entities which exhibit the pattern exceed a predetermined entropy threshold. If such a pattern-check result exists, the message is characterized as having low entropy. Otherwise, the message is characterized as not having low entropy (i.e., as having high entropy).

In various embodiments, the values of the entropy thresholds may depend on the size of the data and on the security level supported, where "security level" may be expressed in terms of the logarithm of the expected number of efforts required by an attacker in order to create ciphertext corruptions that fail to be detected by an implicit integrity system. One of ordinary skill in the art may develop suitable threshold values using formulas from probability theory, for instance.

The following table illustrates some example threshold values for some example scenarios.

| pattern type (for 512 bit data) | threshold (10 bit security) | threshold (20 bit security) | threshold (32 bit security) |
|---|---|---|---|
| sum of two highest nibble frequencies | 35 | 41 | 48 |
| sum of two highest most significant nibble frequencies | 22 | 27 | 32 |
| maximum number of adjacent equal bytes | 3 | 5 | 6 |
| maximum number of bytes equal to 0x00 or 0xFF | 5 | 7 | 10 |
| maximum number of repeated 16-bit words | 3 | 4 | 4 |
| sum of two highest double word frequencies | 3 | 3 | 4 |

Different threshold values may be used in other scenarios.

The algorithm depicted in FIG. 4 employs the same kinds of pattern checks as the algorithm of FIG. 3, except the pattern checks do not use multiple different entropy thresholds, and they do not return Boolean responses. Instead, the pattern checks return the actual value counts, or sums of value counts, for entities that exhibit the patterns or characteristics of each pattern check. For purposes of this disclosure, such value counts and sums of value counts may be referred to as "pattern values" or "PVs." In FIG. 4, the PVs returned by the pattern checks are depicted as PV1-PV8.

As shown in blocks 411-418, the EPM module then converts each of those PVs into an entropy index value. Those entropy index values are depicted in FIG. 4 as E1-E8. The computation of every entropy index value is based on factors such as the type of pattern check used and the number of entities that exhibit the pattern in the data. More details on entropy index values are provided below.

As shown at block 420, the EPM module than determines which of the entropy index values is greatest. As shown at block 430, the EPM module then determines whether or not that maximum entropy index exceeds a predetermined entropy threshold. If the index exceeds the threshold, then the EPM module concludes that the input has low entropy. Otherwise, the EPM module concludes that the input has high entropy.

Thus, the algorithm of FIG. 4 essentially searches for the rarest of the patterns that are exhibited by the input data. The rarest of the patterns is the one that appears with the smallest probability among random data and that is associated with the highest entropy index value. Since the algorithm converts numbers (PV1-PV8) into entropy index values (E1-E8), the algorithm does not need to directly operate on different thresholds characterizing the data entities exhibiting different types of patterns. Instead, the algorithm of FIG. 4 may operate on a single entropy threshold. Moreover, this single threshold may reflect the expected number of efforts required by an adversary in order to produce at least one of the patterns checked by corrupting plaintext data. This number of efforts may be considered a probability, and the algorithm of FIG. 4 associates that probability with the highest entropy index value. Accordingly, the highest entropy index value may reflect the level of security offered by the implicit integrity system.

An "entropy index" may be described as involving a pattern p of type π. For instance, one type of pattern is to measure or count the maximum number of bytes that are equal, as illustrated in block 401. If some input data x demonstrates pattern p of type π, and exactly n entities from x exhibit this pattern, that state may be expressed as follows:

$$x \in p(\pi,n)$$

The above expression may be read as follows:
There exists in data x exactly n entities that have pattern p, where pattern p is of the type π.

For example, when type π denotes the maximum number of bytes that have the same value, the above expression may be read as follows:
There exists in data x exactly n byes that have pattern p, where pattern p is a count of the bytes that (a) have the same value and (b) that value occurs at least as many times in x as any other value.

Additionally, for purposes of this disclosure, the letter E is used to denote an "entropy index value" for a pattern p of type π. Specifically, the entropy index value E associated with the pattern type π and entity number E is defined as the negative logarithm of the probability that $x \in p(\pi, n)$ when x is random (e.g., when x is obtained from the output of a random oracle). This statement may also be expressed as follows:

$$E(\pi,n) = -\log_2 Pr(x \in p(\pi,n) | x \text{ is random})$$

According to the definition above, the probability of seeing the pattern $p(\pi, n)$ in a random data value x is equal to $2^{-E}$. Entropy index E is measured in bits. Furthermore, the expected number of random values that would need to be inspected until one is found that demonstrates the pattern $p(\pi, n)$ is $2^E$. As a result, the entropy index E associated with a pattern type π and a value count n is also equal to the logarithm of the expected number of random values that would need to be inspected until a value x is found such that $x \in p(\pi, n)$.

In addition, patterns may appear in different parts of a message. According to the present disclosure, the EPM module may search for patterns in each part of a message separately. The EPM module may then compute a cumulative entropy index as the sum of the entropy indexes generated for each different part of the message. For example, a message may consist of 4096 bits. The EPM module may divide this message into 8 parts of 512 bits each and then compute a separate entropy index for each 512-bit part. If 6 of those entropy indexes are required to demonstrate an entropy index of 32 bits, the overall security level that can be supported is 6×32-ε bits=192-c bits for some exponent drop ε. The exponent drop ε is associated with the fact that an attacker could succeed if the attacker produces patterns in any six out of the eight parts of the plaintext derived from the corrupted ciphertext payload. Since 8-choose-6×$2^{-195}=2^{-187.2}$, the overall level of security offered in this example is 187 bits.

This disclosure mentions various different types of entropy index values. Example formulas for different types of entropy index values are provided below. In particular, with regard to byte equality, a formula for computing an entropy index value E, for a data unit consisting of n bytes which demonstrates m bytes being equal to each other, may be expressed as follows:

$$E \cong -\log_2\left(\binom{n}{m}\left(\frac{1}{256}\right)^{m-1} \cdot \left(1 - \frac{1}{256}\right)^{n-m}\right)$$

Similarly, with regard to word equality, a formula for computing entropy index value E, for a data unit consisting of n 16-bit words which demonstrates m words being equal to each other, may be expressed as follows:

$$E \cong -\log_2\left(\binom{n}{m}\left(\frac{1}{65536}\right)^{m-1} \cdot \left(1 - \frac{1}{65536}\right)^{n-m}\right)$$

With regard to adjacent byte equality, a formula for computing an entropy index value E, for a data unit consisting of n bytes which demonstrates m bytes being adjacent and equal to each other, may be expressed as follows:

$$E \cong -\log_2\left((n-m+1)\left(\frac{1}{256}\right)^{m-1} \cdot \left(1 - \frac{1}{256}\right)^{n-m}\right)$$

With regard to special values, a formula for computing the entropy index value E, for a data unit consisting of n bytes where m bytes take values from a set V of cardinality |V|, may be expressed as follows:

$$E = -\log_2\left(\binom{n}{m}\left(\frac{|V|}{256}\right)^m \cdot \left(1 - \frac{|V|}{256}\right)^{n-m}\right)$$

With regard to double-word frequencies, a formula for computing the entropy index value E, for a data unit consisting of n double words, where the sum of the two highest double-word frequencies is equal to m, may be expressed as follows:

$$E \cong -\log_2\left(\sum_{i=1}^{n}\sum_{\substack{j=1,\\i+j=m}}^{n}\binom{n}{i}\left(\frac{1}{2^{32}}\right)^{i-1} \cdot \binom{n-i}{j}\left(\frac{1}{2^{32}-1}\right)^{j-1}\right)$$

With regard to nibble frequencies, a formula for computing the entropy index value E, for a data unit consisting of n nibbles, where the sum of the two highest nibble frequencies is equal to m, may be expressed as follows:

$$E \cong -\log_2\left(\sum_{i=1}^{n}\sum_{\substack{j=1,\\i+j=m}}^{n}\binom{n}{i}\left(\frac{1}{16}\right)^{i-1}\left(\frac{15}{16}\right)^{n-i} \cdot \binom{n-i}{j}\left(\frac{1}{15}\right)^{j-1}\left(\frac{14}{15}\right)^{n-i-j}\right)$$

Other formulas may be used for other types of entropy index values.

FIGS. 3 and 4 illustrate many different types of pattern checks. In alternative embodiment or scenarios, EPM modules may use different sets of pattern checks, including subsets of the checks described herein or sets including variations of one or more of the checks described herein or other suitable types of checks. Similarly, EPM modules may apply different sets of pattern checks to different types of input data. Implicit integrity engines may thus use the present teachings to advantage in many different environments, including environments with small message or packet sizes (such as an environment involving short messages exchanged between sensors) and environments in which the sizes of symbols where deterministic behavior is demonstrated may vary significantly. For instance, in different environments deterministic behavior may be observed over sets of nibbles, bytes, words or double words. According to the present disclosure, an EPM module for a particular environment uses algorithms that characterize the overwhelming majority of the messages as having low entropy. And yet those same algorithms, when applied to corrupted plaintext values will, with probability very close to one, characterize those values as having high entropy.

Referring again to FIG. 2, after implicit integrity engine 40 uses EPM module 42 to apply the EPM tests to the message, implicit integrity engine 40 may then use the test results to determine whether the message has sufficiently low entropy, as shown at block 220. If the entropy of the message is not sufficiently low, implicit integrity engine 40 may send the message with an ICV. For instance, as shown at blocks 222 and 224, implicit integrity engine may encrypt plaintext message 34A into ciphertext message 50A and then generate an ICV for ciphertext message 50A. However, in alternative embodiments, implicit integrity engines may generate ICVs from plaintext messages. Nevertheless, such an ICV may be referred to as an ICV for the payload. As shown at block 226, implicit integrity engine 40 may then load ciphertext message 50A into the payload portion of a packet addressed to destination device 60 and implicit integrity engine 40 may load the corresponding ICV into another portion of that packet. As shown at block 228, implicit integrity engine may also clear (or set) a flag in the packet to indicate that this particular packet is not relying on implicit integrity but instead includes an ICV. Additional details concerning various packet formats are described below with regard to FIG. 8. As shown at block 240 of FIG. 2, implicit integrity engine 40 may then transmit the packet to destination device 60.

However, referring again to block 220, if the entropy was found to be low, implicit integrity engine 40 may then use diffusion module 44 to fully diffuse each bit of plaintext message 34A to all bits of the cryptographic output, as shown at block 232. For purposes of this disclosure, the output of diffusion module 44 may be referred to as a "diffused message." As shown at block 234, implicit integrity engine 40 may then use encryption module 46 to convert the diffused message into ciphertext message 50A. As shown at block 236, implicit integrity engine 40 may then load ciphertext message 50A into the payload portion of a packet addressed to destination device 60, without generating an ICV, and without including an ICV for the payload in the packet. As shown at block 238, implicit integrity engine 40 may also set (or clear) a flag in the packet to indicate that the packet is using implicit integrity. As shown at block 240, implicit integrity engine 40 may then transmit the packet to destination device 60. The process for generating and transmitting a message may then end.

In the process described above, diffusion is applied only to messages that are sent with implicit integrity, but in alternative embodiments, diffusion may also be applied to messages that are sent with ICVs.

Figure 5:
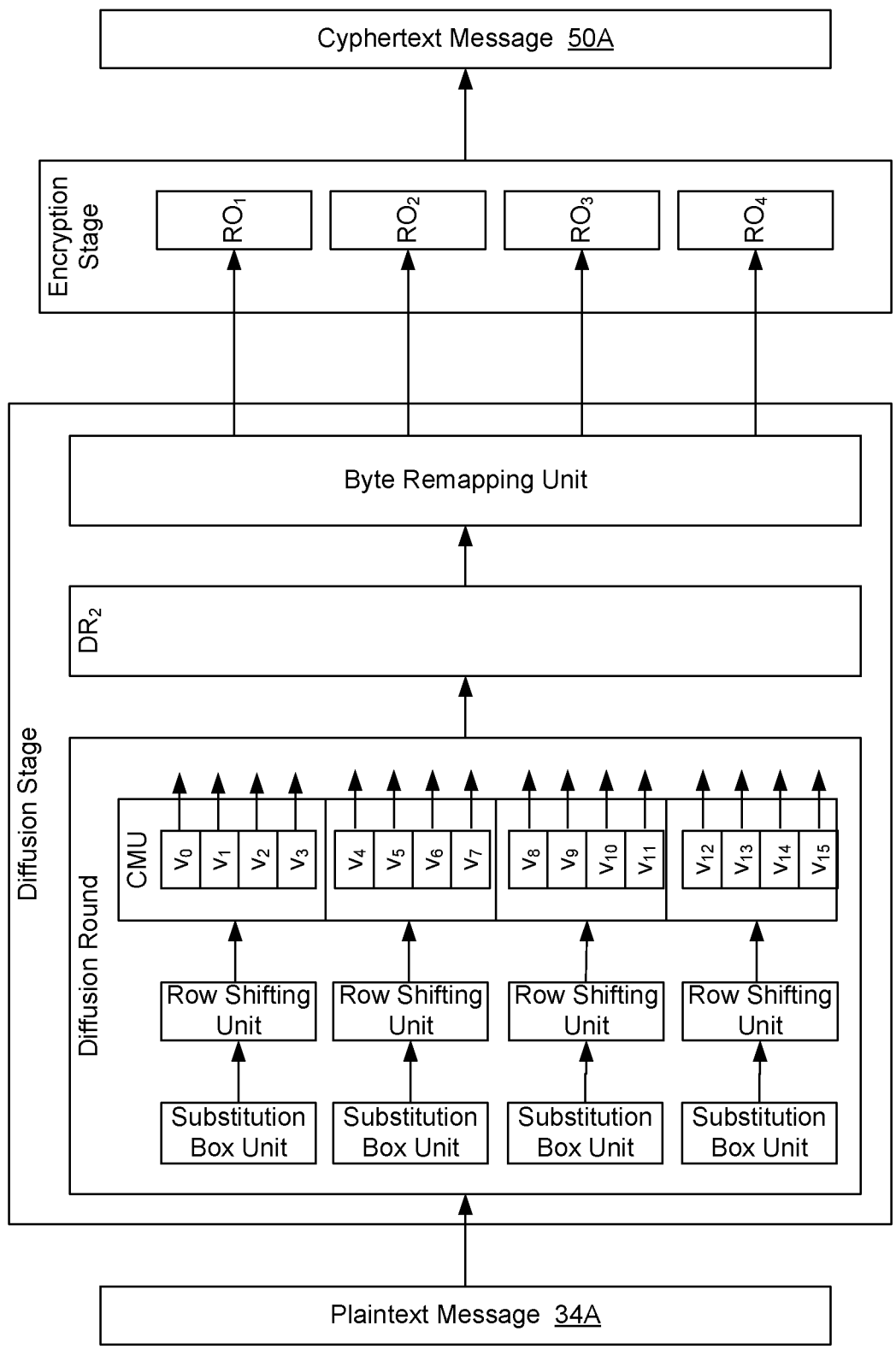
FIG. 5 is a flow diagram illustrating an example embodiment of a process for using an implicit integrity engine to generate an outgoing message.

FIG. 5 is a flow diagram illustrating an example embodiment of a process for using implicit integrity engine 40 to generate an outgoing message. From a high level, the diffusion stage of FIG. 5 provides additional details for step 232 of FIG. 2 and operations performed by diffusion module 44. The encryption stage of FIG. 5 provides additional details for step 234 of FIG. 2 and operations performed by encryption module 46. For purposes of this disclosure, diffusion module 44 and encryption module 46 may be referred to collectively as a "message processing construction," a "cryptographic construction," or simply a "construction." That construction may also include EPM module 42, as well as EPM module 82, inverse diffusion module 84, and decryption module 86. According to the present disclosure, that construction enables data processing systems to utilize implicit integrity when communicating with each other.

In one embodiment, the construction is designed to convert plaintext messages of a certain width into ciphertext messages of the same width. However, components within the construction (e.g., substitution box units, random oracles, etc.) may have a width which is a factor of the entire message width. In addition, some components may operate on even smaller blocks of data. A specific block of data that is operated on by a component may be referred to as an "entity." For purposes of this disclosure, the width of components within the structure may be referred to as "W1," the width of an entity may be referred to as "W2," and the width of the entire construction may be referred to as "W3." Since W3 may be bigger than W1, in order to process different parts of the message data in parallel, it may be necessary to use multiple instances of components having width W1. That number of instances may be referred to herein as "N." Thus, W1 times N equals W3. In the illustrated embodiment, plaintext message 34A is a sequence of 512 bits and units within the construction such as random oracles work on 128 bits at a time. Thus, W3 is 512 bits, W1 is 128 bits, and N is 4.

As illustrated in FIG. 5, in the diffusion stage, diffusion module 44 takes plaintext message 34A and runs it through a first diffusion round to generate a first intermediate result. Diffusion module 44 then takes the first intermediate result and runs it through a second diffusion round (DR$_2$) to generate a second intermediate result. More specifically, each diffusion round uses N substitution box (S-box) units, followed by N row shifting units, followed by N column mixing (CM) units (CMUs), to process N portions of the message in parallel.

Diffusion module 44 then takes the second intermediate and runs it through an entity reordering or entity remapping unit. Moreover, entity reordering takes place across the entire width W3 of the construction. Also, as described in greater detail below, in the illustrated embodiment, the entities that are reordered are bytes. In other words, the width (W2) of each entity that is reordered is eight bits. Consequently, the entity reordering unit may also be referred to as a "byte reordering unit" or a "byte remapping unit." The output of the byte remapping unit may be referred to as the "diffused message."

Encryption module 46 then takes the diffused message and runs it through N random oracles (ROs) to generate ciphertext message 50A. In the illustrated embodiment, encryption module 46 uses four ROs (RO$_1$-RO$_4$) to process four portions of the diffused message in parallel. Each RO is a mathematical function which performs encryption and decryption and which is bijective (i.e., invertible). Thus, for a given input value, an RO outputs a value which is indistinguishable from random. Standard block ciphers such as Advanced Encryption Standard (AES) block ciphers satisfy this property if the number of input/output pairs queried is smaller than a query bound. In the case of AES, this query bound is at least $2^{64}$. If this bound is larger than the desired security level, as is typically the case for implicit integrity, AES can be safely used as the realization of the four random oracles RO$_1$-RO$_4$.

In the illustrated embodiment, the implicit integrity engines support 32-bit implicit integrity. Also, implicit integrity may be achieved or realized by using one or more preprocessing steps or functions, in conjunction with a standard encryption stage. For instance, the four ROs may be implemented as a standard encryption stage that is 512 bits wide and processes four 128-bit blocks. The input for that encryption stage may be the output of the entity reordering stage. And the input for the entity reordering stage may be the output from the two diffusion rounds. In one embodiment, each encryption stage uses a methodology that is recognized as an AES.

As illustrated, the two diffusion rounds may use two sequences of column mixing, row shifting, and S-box stages. An electronic code book (ECB) may be used as part of the diffusion process. For instance, the diffusion rounds may be implemented as two rounds of AES-ECB, repeated four times. In other words, diffusion module 44 may split plaintext message 34A into four sections of 128 bits each (W1), and then apply two consecutive rounds of AES-ECB decryption to each section. Similarly, for the decrypt path, inverse diffusion module 84 may split the 512-bit output of the byte-remapping step into four sections of 128 bits each (W1), and then, for each section, apply two consecutive rounds of AES-ECB decryption.

In the encrypt path, the standard encryption stage may be the last processing step performed by the cryptographic system. Also, the preprocessing steps of two rounds of AES-ECB and byte remapping may use keys which are different from the standard encryption stage keys. Since the output is directly obtained from the standard encryption stage, it is evident that the preprocessing steps do not reduce the cryptographic strength of the standard encryption stage in any way.

Additionally, two rounds of AES-ECB succeed in fully diffusing every bit of input to every bit of output, for each 128-bit section. And the AES-ECB output need not be cryptographically strong. The subsequent byte remapping stage succeeds in uniformly distributing the bytes coming from every 128-bit section of the second intermediate result to every 128-bit section of the diffused message (which then serves as input to the standard encryption stage). Due to the strong confusion and diffusion properties of the standard encryption stage, the cryptographic system succeeds in both strongly encrypting the original input and fully diffusing every bit of the input to every bit of the 512-bit output. On the decrypt path, this wide diffusion property helps with fully propagating ciphertext corruptions to all bits of the final plaintext. Consequently, visible patterns in the original plaintext are destroyed with very high probability. This property of implicit integrity engines makes implicit integrity possible.

Additional details on the operation of the overall message processing construction and the operation of components within that construction are provided below, in the context of processing a received message.

Figure 6:
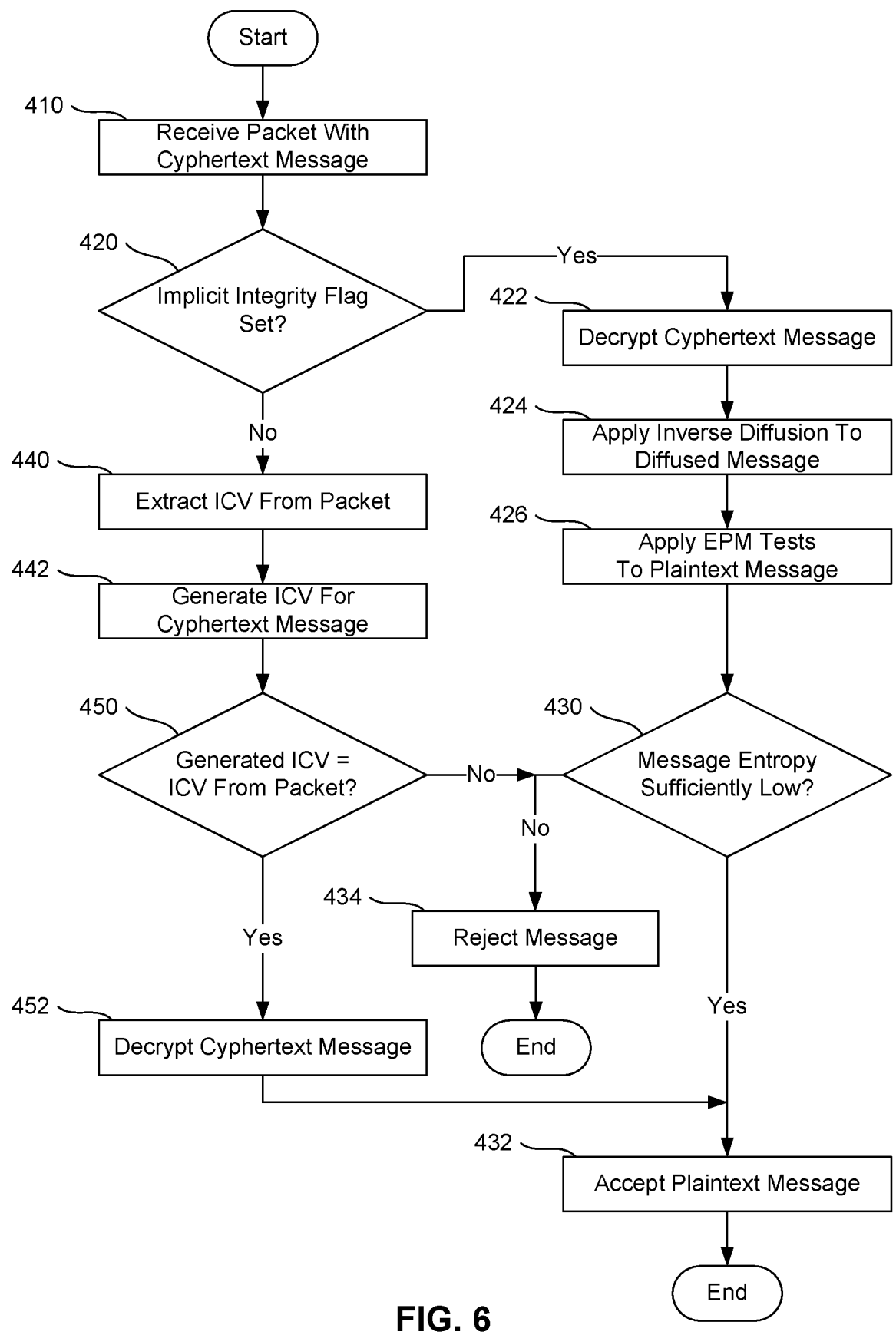
FIG. 6 presents a flowchart of an example embodiment of a process for using an implicit integrity engine to validate an incoming message.

FIG. 6 presents a flowchart of an example embodiment of a process for using implicit integrity engine 80 to validate an incoming message. As shown at block 410, that process may start with implicit integrity engine 80 receiving a packet with a payload that contains ciphertext message 50B. As shown at block 420, implicit integrity engine 80 may then determine whether an implicit integrity flag in the packet is set to indicate that the packet is relying on implicit integrity.

If the implicit integrity flag is not set, implicit integrity engine 80 may extract an ICV from the packet, as shown at block 440. In addition, as shown at block 442, implicit integrity engine 80 may generate an ICV for the payload. As shown at block 450, implicit integrity engine 80 may then determine whether the generated ICV matches the extracted ICV. If those ICVs match, implicit integrity engine 80 may decrypt ciphertext message 50B into plaintext message 34B, as shown at block 452, and implicit integrity engine 80 may accept plaintext message 34B as good, as shown at block 432. For instance, implicit integrity engine 80 may pass plaintext message 34B to communications application 72. However, referring again to block 450, if the ICVs do not match, implicit integrity engine 80 may reject the message, as shown at block 434.

However, as indicated above, in alternative embodiments, implicit integrity engines may generate ICVs from plaintext messages. Accordingly, when an implicit integrity engine receives a packet, the implicit integrity engine may decrypt the payload and then generate the ICV based on the plaintext.

However, referring again to block 420 for the embodiment of FIG. 6, if the implicit integrity flag is set, implicit integrity engine 80 may use decryption module 86 decrypt ciphertext message 50B into a diffused message, as shown at block 422. As shown at block 424, implicit integrity engine 80 may then use inverse diffusion module 84 to convert the diffused message into plaintext message 34B. As with diffusion module 44, inverse diffusion module 84 fully diffuses the input into the output, such that even a single bit change in the input affects all bits of the output. Consequently, even a single bit corruption in ciphertext message 50B will propagate to all bits of plaintext message 34B, which would destroy any patterns that existed in the original plaintext message 34A.

As shown at block 426, implicit integrity engine 80 may then use EPM module 82 to test plaintext message 34B for entropy. As shown at block 430, implicit integrity engine 80 then determine whether the entropy of plaintext message 34B is low, based on the result from EPM module 82. If the entropy is not sufficiently low, implicit integrity engine 80 may reject the message, as shown at block 434. Otherwise, as shown at block 432, implicit integrity engine may accept the message, for instance by passing plaintext message 34B to communications application 72. The process of FIG. 6 may then end.

However, referring again to blocks 430 and 434, in an alternative embodiment, an implicit integrity engine may attempt to correct errors before (or instead of) rejecting a message that has implicit integrity but high entropy. For instance, an implicit integrity engine may propose alternative similar messages (e.g., by flipping bits or trying alternative byte values at all positions) and determine whether any of the alternative proposed messages passes the integrity check.

Figure 7:
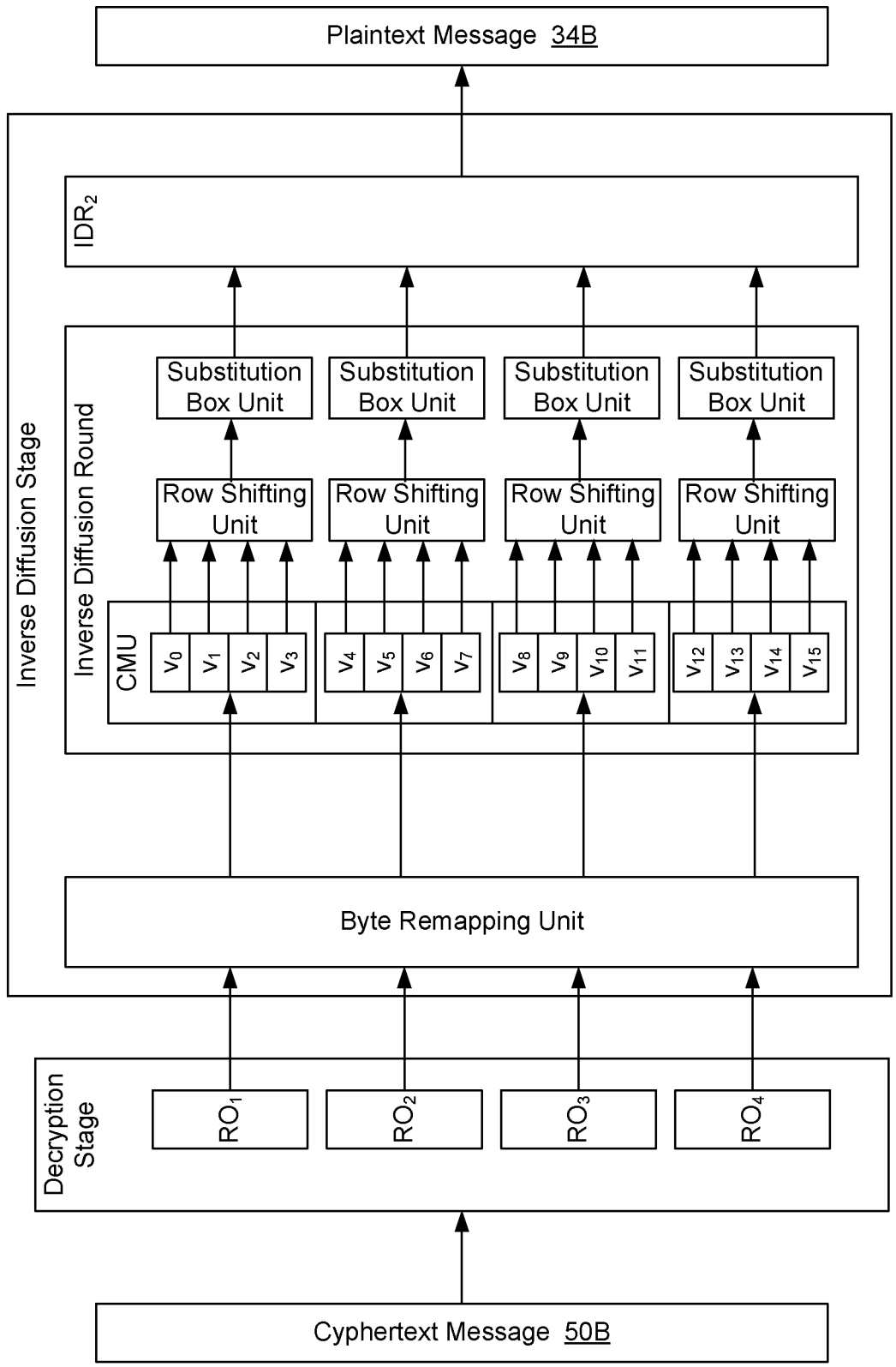
FIG. 7 is a flow diagram of an example embodiment of a process for using an implicit integrity engine to decrypt an incoming message.

FIG. 7 is a flow diagram of an example embodiment of a process for using an implicit integrity engine to decrypt an incoming message. From a high level, the decryption stage of FIG. 7 provides additional details for step 422 of FIG. 6 and operations performed by decryption module 86. The inverse diffusion stage provides additional details for step 424 of FIG. 6 and operations performed by inverse diffusion module 84. Accordingly, the flow illustrated in FIG. 7 may be referred to as the "decrypt path." And as indicated above, EPM module 82, inverse diffusion module 84, and decryption module 86 may be considered parts of a message processing construction.

As illustrated, the input is ciphertext such as ciphertext message 50B and the output is plaintext such as plaintext message 34B. The illustrated decrypt path may be implemented as the reverse or inverse of the encrypt path depicted in FIG. 5. More specifically, the decrypt path may start with a decryption stage which uses four ROs ($RO_1$-$RO_4$) to convert ciphertext message 50B into a diffused message. In FIG. 7, $RO_1$-$RO_4$ are generalizations of four symmetric encryption/decryption units. Each unit applies or works on an input of width W1. As indicated above, in the illustrated embodiment, W1 is 128 bits. An RO may use a methodology that is recognized as an AES. For instance, an RO may use a methodology based on or derived from the XOR-encrypt-XOR (XEX) methodology, such as the XEX-based tweaked-codebook mode with ciphertext stealing (XTS) methodology. For example, in one embodiment, each RO implements a ten-round XTS-AES methodology, and each RO applies that processing to a separate 128-bit block of the input. Accordingly, the processing involves encryption or decryption which uses a key value K and a tweak T.

When considering adversary models associated with on-line attacks, in the event of such an attack, the detection of even a single corruption can expose the attack. For such models, a bound in the number of queries issued by an adversary can be set. Within such bound (e.g., $2^{32}$ queries if XTS-AES is used), the block cipher stages employed may safely approximate random oracles. Analytical results related to this topic may be found in the article from 1998 entitled "Building PRFs from PRPs" by Chris Hall et al.

In alternative embodiments, an implicit integrity engine may use a different number N of random oracles.

Implicit integrity engine 80 may then use inverse diffusion module 84 to process the output of the decryption stage with an inverse diffusion stage, as shown in FIG. 7. The inverse diffusion stage may start with an entity reordering operation. As indicated above, an entity is a bit sequence of length W2. In the embodiment of FIG. 7, W2 is eight bits for inverse diffusion module 84. Accordingly, the entity reordering operation may be referred to as a "byte remapping operation," and the component which performs that operation may be called a "byte remapping unit." Additionally, the byte remapping unit performs reordering across the entire width W3 of the construction. Entity reordering is an interleaving operation which ensures that the outputs of the four ROs of the construction are evenly distributed among or diffused to the subsequent processing stages.

Figure 8:
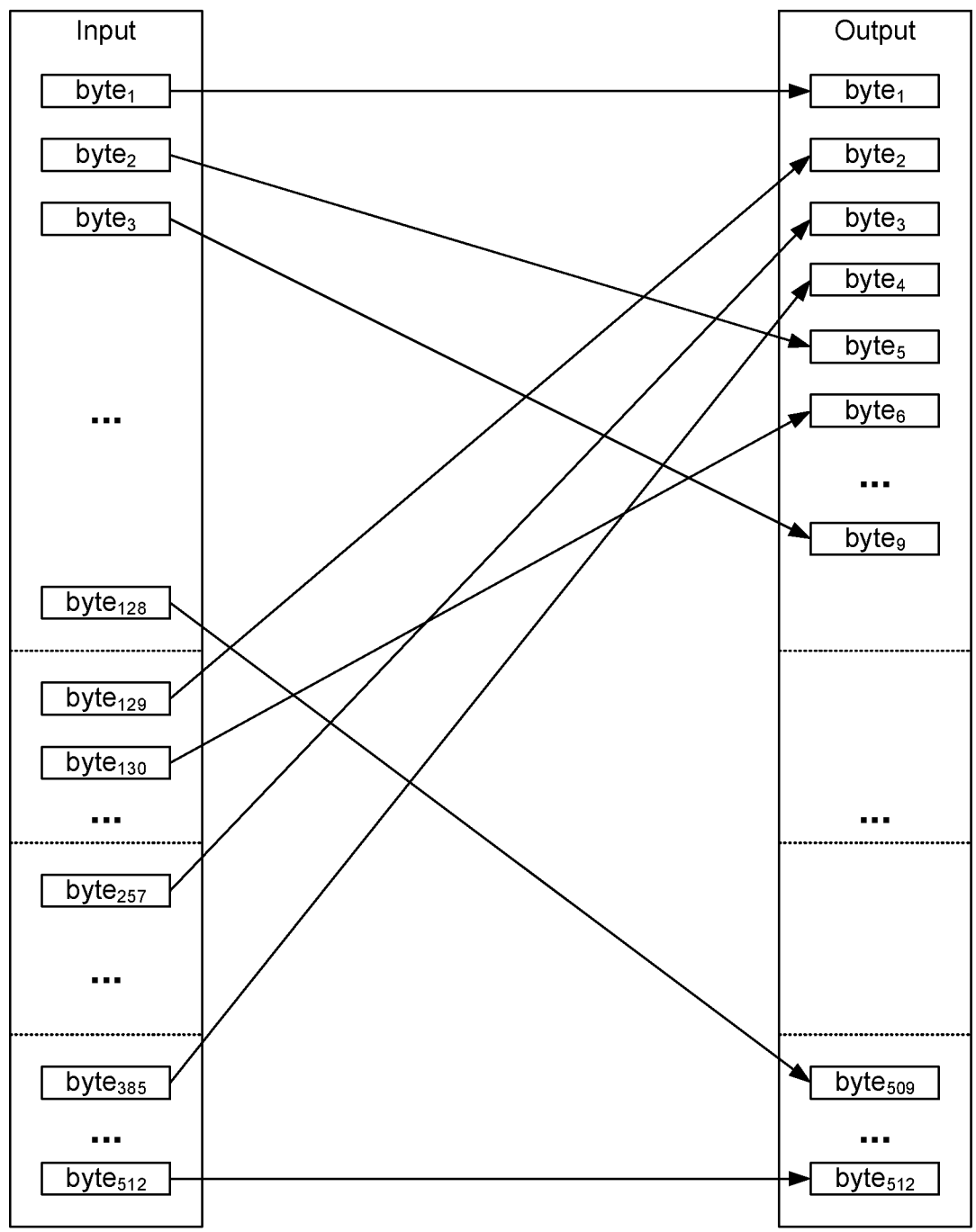
FIG. 8 is a flow diagram illustrating an example methodology for reordering entities.

FIG. 8 is a block diagram illustrating an example methodology for reordering entities. Specifically, the illustrated embodiment pertains to a methodology used by inverse diffusion module 84 for a construct in which W3 is 512 bits, W1 is 128 bits, and N is 4. Also, W2 is eight bits, and so the entities are bytes. Diffusion module 44 may use the reverse or inverse of the illustrated methodology. Alternatively, diffusion module 44 may use the illustrated methodology, and inverse diffusion module 84 may use the inverse methodology.

As shown, the bytes are diffused or remapped from an input block of 512 bits to an output block of 512 bits. As indicated by dashed lines, the input and output blocks may contain four consecutive 128-bit sections. For inverse diffusion module 84, each section in the input block may come from a different RO, and each section of the output block may go to a different CMU, as shown in FIG. 7.

As shown in FIG. 8, each byte is reordered to a new position, so that all bytes coming from the same 128-bit section of the input block are evenly distributed among the 4 128-bit sections of the output block. For instance, the first set of 128 bits of the input block may contain the output from $RO_1$, and the first byte from the input block is mapped to the first position in the output block. The second input byte is mapped to the fifth output byte. The third input byte is mapped to the ninth output byte, and so on.

Similarly, the second set of 128 bits in the input block may contain the output from $RO_2$. The first of those bytes (illustrated as "$byte_{129}$") is mapped to the second output byte. The second byte in the second set of 128 bits (illustrated as "$byte_{130}$") is mapped to a sixth output byte. A third byte may be mapped to a tenth output position, and so on.

Similarly, the third set of 128 bits in the input block may contain the output from $RO_3$. The first of those bytes (illustrated as "$byte_{257}$") is mapped to the third output byte, and so on. And the first byte in the fourth set of 128 bits in the input block (which may contain the output from $RO_4$ is mapped to the fourth output byte. And so on.

Referring again to FIG. 7, after inverse diffusion module 84 performs entity remapping, inverse diffusion module 84 may process the remapped data with two consecutive inverse diffusion rounds. As illustrated, the second inverse diffusion round may be referred to as "$IDR_2$". Also, $IDR_2$ may be the same as the first inverse diffusion round, but based on the output from the first inverse diffusion round, rather than the output of the entity remapping unit.

In the illustrated embodiment, the first part of an inverse diffusion round performs CM. Specifically, each CMU may perform column mixing by performing AES-like bit linear processing on its input. A function f is bit linear if $f(x \text{ XOR } y) = f(x) \text{ XOR } f(y)$. In one embodiment, each CMU implements the inverse mix columns or the mix columns transformation of AES. In general, the requirement for each CMU is to implement bit linear systems that connect m W2-bit input entities to m W2-bit output entities. The rank of each bit linear system for each output entity should be exactly W2. AES mix columns and inverse mix columns transformations meet this requirement for m=4 and W2=8 bits. In the embodiment of FIG. 7, there are 16 first stage CM transformations denoted as $v_0$-$v_{15}$. And when inverse diffusion module 84 executes $IDR_2$, the CMUs will perform 16 second stage CM transformations. In general, the number of CM transformations employed in each stage could be different.

As shown, after column mixing, inverse diffusion module 84 uses four row shifting units to perform row shifting. Row shifting is an entity reordering operation similar to byte remapping. However, row shifting occurs only inside blocks of W1 bits and not across such blocks as in the case of byte remapping. Row shifting units operate on entities of W2 bits and perform cyclic rotation of such entities by increasing the number of rotate positions one at a time, row by row. As in AES, it may be assumed that entities of W2 bits are arranged in a matrix formation. In this formation, rows may be cyclically rotated either to the left or to the right by a number of positions which is increasing by one, row-by-row. Row 1, for instance, may be shifted by one entity position to the left, row 2 by two entity positions to the left, etc. In one embodiment, row shifting units implement the inverse shift rows or the shift rows transformation of AES.

After row shifting, inverse diffusion module 84 uses four S-box units to perform bit mixing transformations. In the illustrated embodiment, like the CMUs and the row shifting units, S-box units utilize a granularity of W2 bits. Accordingly, each S-box unit in the figures represents an array of multiple substitution boxes, with each of those S-boxes having a width of W2 bits. An S-box is realized as a sequence of two processing steps. The first step is addition with a key value K2. This key value K2 is different from the keys used in the decryption/encryption stages performed by $RO_1$-$RO_4$. The second step is a strong non-linear bit mixing transformation similar to the AES S-box or the inverse AES S-box. In general, this second step applies to sets of cardinality W2 bits and not just 8 bits. Combining key additions with strong non-linear bit mixing is equivalent to having an array of randomly selected pseudo-random permutations (PRPs) of width W2 operating in the construction. If the key values K2 are set at the beginning of the operation of the construction, this is equivalent to selecting a set of W2-bit PRPs at random and using these PRPs as substitution boxes.

Under these considerations, specific security claims for the illustrated construction may be proven. Such security claims and proofs hold when PRPs are selected once at the beginning of operation of the construction. This means that an implicit integrity engine can have a single key set for the S-box stages, independent of the keys used by the block ciphers that implement the random oracles.

The present teachings may be used to advantage in many different kinds of networks, with many different packet sizes, and with many different message sizes.

Figure 9:
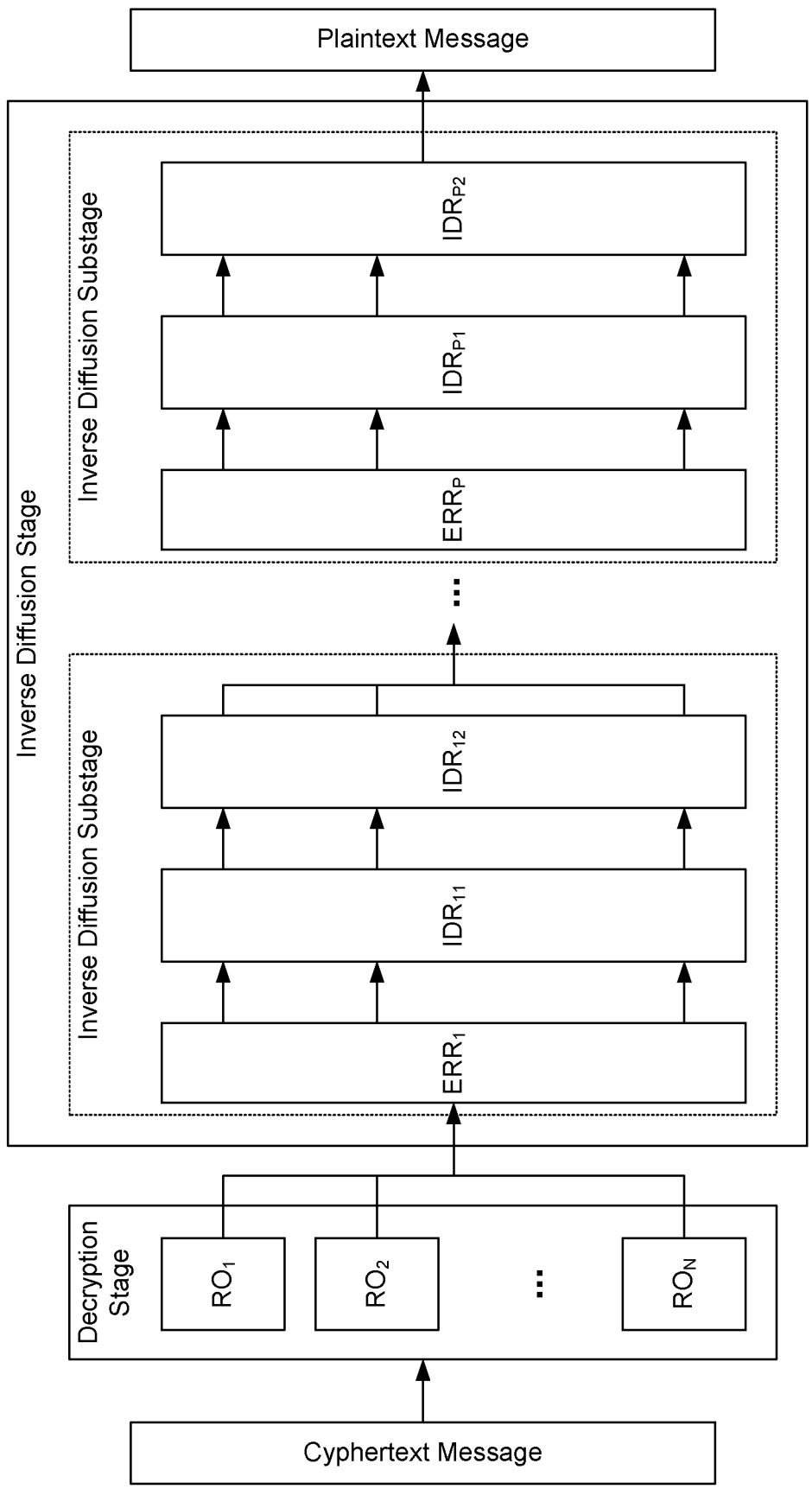
FIG. 9 is a flow diagram illustrating a generalized process for processing a received message with implicit integrity.

FIG. 9 is a flow diagram illustrating a generalized process for processing a received message with implicit integrity. The teachings of FIG. 9 may be used to support wide diffusion over arbitrary message sizes. Like FIG. 7, FIG. 9 shows a decrypt path. Also, FIG. 9 illustrates that the decryption stage may include N ROs, where N equals the width (W3) of the ciphertext message divided by the width (W1) of an RO. In addition, FIG. 9 illustrates that the inverse diffusion stage may include P inverse diffusion substages, where P equals as many substages as necessary to fully diffuse N sets of W1 bits into one set of W3 bits to form the final plaintext message. Each diffusion substage may include an entity remapping round (ERR) and two inverse diffusion rounds (IDRs). Each ERR may operate like the byte remapping unit of FIG. 7, and each IDR may operate like the IDR of FIG. 7, for instance with column mixing units, row shifting units, and S-box units. The number inverse diffusion rounds employed varies, depending on factors such as the network protocol specification and the packet length.

Also, in different embodiments or scenarios, the width parameters of the components may vary. For example, the column mixing units for an inverse diffusion round may perform bit-linear processing using systems of full rank. In other words, in the case of mix columns, for each output byte (8 bits), 32 inputs may be connected in a system to produce each bit of the output. "Full rank" means that the 8 equations defining the bits of the output are independent of each other. And this definition may be generalized for any width value (e.g., W2).

Similarly, entity reordering stages such as ERR and row shifting are based on extending the byte remapping stage and the row shifting stages depicted in FIG. 7. Entity reordering stages may be implemented as AES shift rows and inverse shift rows transformations. S-box stages may be implemented as arrays of randomly selected PRPs.

An implicit integrity engine may use the reverse arrangement to implement an encrypt path, with a sequence of S-box, row shifting, column mixing, and entity reordering stages repeated to enable the construction to achieve full diffusion across arbitrarily wide blocks in a simple and effective manner. Such an encrypt path is described below with regard to FIG. 10.

Figure 10:
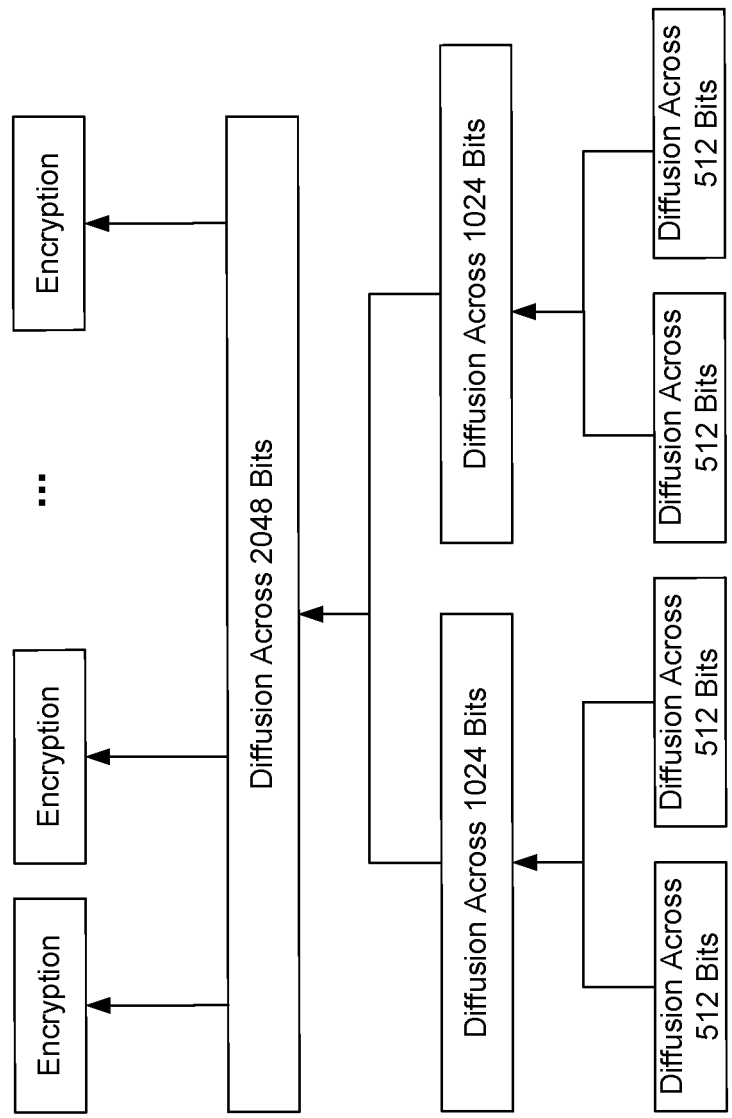
FIG. 10 is a flow diagram illustrating a generalized process to prepare a message for transmission with implicit integrity.

FIG. 10 is a flow diagram illustrating a generalized process to prepare a message for transmission with implicit integrity. The illustrated process has been generalized to handle messages that are 2048 bits wide. The methodology illustrated in the process of FIG. 10 may easily be altered and used to implement constructions that achieve full diffusion across arbitrarily wide messages.

For the encrypt path shown in FIG. 10, a diffusion module first diffuses across 512 bits, then across 1024 bits, and finally across 2048 bits. The results of the wide diffusion operation are then passed into a standard encryption stage, which produces a strongly encrypted ciphertext output. As mentioned before, the confidentiality properties of the standard encryption stage are not altered in any way by the preprocessing performed.

To analyze the security of an implicit integrity engine, two kinds of adversaries may be considered: an input perturbing adversary and an oracle replacing adversary. First, an input perturbing adversary is an algorithm which is given a set of (i) ciphertext; (ii) decrypt path inputs $q_0, \ldots, q_{m-1}$ the outputs of which exhibit patterns; and (iii) a query bound b. The algorithm succeeds if it finds a new input word y which is different from $q_0, \ldots, q_{m-1}$ the output of which also exhibits patterns. Security in this adversary model indicates protection against on-line corruption attacks.

Second, an oracle replacing adversary is an algorithm which is given a set of (i) ciphertext messages $q_0, \ldots, q_{m-1}$ the outputs of which exhibit patterns and (ii) a query bound b like the first one. This algorithm succeeds if it finds a set of new random oracles $RO_1', RO_2'$, etc. in order to replace the ingredient random oracles of the original construction so that there exists an input query word $y \in \{q_0, \ldots, q_{m-1}\}$ the output of which continues to exhibit patterns even when the random oracles of the construction $RO_1, RO_2$, etc. are replaced by $RO_1', RO_2'$, etc. Security in this adversary model indicates protection against network traffic replay attacks.

In at least one embodiment, an implicit integrity engine according to the present disclosure is secure against these two adversary models, meaning that the probability of any adversary algorithm succeeding is negligible. For instance, an implicit integrity engine may belong to a special class of constructions referred to as "random oracles according to observer functions" or "$RO^2$". An observer function is a function that searches the output of cryptographic systems in order to detect unusual behavior, such as the presence of patterns. If an observer function detects unusual behavior with the same or similar probability in the output of a cryptographic system as in the output of a random oracle, then the cryptographic system belongs to the class of $RO^2$ constructions associated with that specific observer function. A proof may be reduced to showing that a particular system indeed belongs to a class of $RO^2$ constructions associated with network application-related observer functions, query bounds, and indistinguishability parameters. This means that, no matter how the adversary corrupts the ciphertext, the probability that patterns are visible in the plaintext can be bounded. This property applies to an implicit integrity engine according to the present disclosure because the differentials which are associated with bit corruptions and flow through an implicit integrity engine are random, uniformly distributed, and statistically independent. These differentials originate from ingredient random oracles $RO_1$, $RO_2$, etc. With the help of the internal processing stages of the construction, these differentials remain random, uniformly distributed, and statistically independent as they flow through the construction and continue to be so when they reach the construction output.

Source device 10 and destination device 60 may us a communication protocol that is enhanced, relative to conventional communication protocols.

Figure 11:
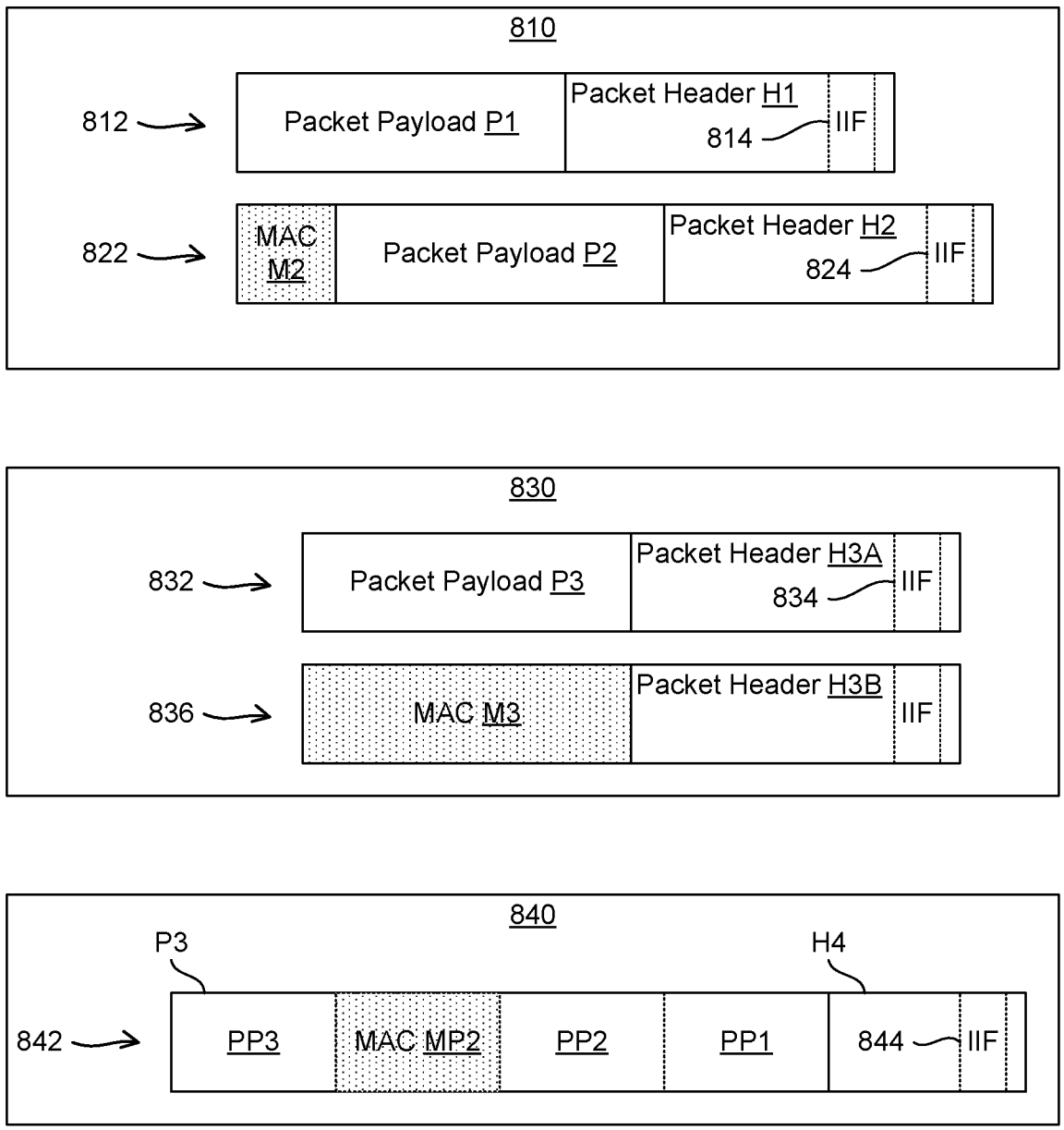
FIG. 11 is a block diagram illustrating various packets that provide for implicit integrity according to various example formats.

FIG. 11 is a block diagram illustrating various packets that provide for implicit integrity according to various example formats. For instance, in one embodiment, devices may use a first communication protocol which involves packets that are structured as shown in block 810. In another embodiment, devices may use a second communication protocol which involves packets that are structured as shown in block 830. In another embodiment, devices may use a third communication protocol which involves packets that are structured as shown in block 840. Each of those protocols may provide for packets which include data structures pertaining to implicit integrity. For purposes of this disclosure, such a data structure may be referred to as an "implicit integrity indicator," an "implicit integrity field," or an "IIF." In the embodiments of FIG. 11, each IIF is implemented as a set of one or more bits within the packet header.

In particular, in block 810 illustrates two packets according to the first communication protocol. The first packet 812 includes a packet header H1 and a packet payload P1. Similarly, the second packet 822 includes a packet header H2 and a packet payload P2. Each packet payload may contain a substantive message that is being communicated (e.g., ciphertext message 50A). Packet header P1 includes an IIF 814, and packet header P2 includes the same kind of IIF 824. In packet 812, IIF 814 is a bit that has been set (or cleared) to indicate that packet 812 is using implicit integrity. Accordingly, packet 812 does not include an ICV for payload P1. In packet 822, IIF 824 is a bit that has been cleared (or set) to indicate that packet 822 is not using implicit integrity, but is instead using an ICV for the payload. Accordingly, packet 822 includes an ICV for payload P2. That ICV is illustrated as a MAC M2. In other embodiments, IIFs may use multiple bits to carry additional information, such as information to identify a particular implicit integrity algorithm for the packet. Thus, according to the first communication protocol, the IIF indicates whether a particular packet includes an ICV for that packet's payload.

The second communication protocol is similar, but when an explicit ICV is used, it is sent in a separate packet from the packet with the corresponding message. Block 830 illustrates two packets according to the second communication protocol. The first packet 832 include a packet header H3A and a packet payload P3. The second packet 836 includes a packet header H3B, but no packet payload. Instead, packet 836 includes an ICV (e.g., MAC M3) for the payload P3 of packet 832. Also, packet header H3A includes an IIF 834, and packet header H3B also includes an IIF. In packet 832, IIF 834 is a bit that has been set or cleared to indicate whether or not packet 832 is using implicit integrity. If packet 832 is not using implicit integrity, the receiving device will look to a subsequent packet (e.g., packet 836) for the ICV for the payload of packet 832.

According to the third communication protocol, the packet payload can be partially protected by ICVs. In other words, the payload may be considered as having two or more sections or parts, and each part may be protected independently with either implicit integrity or an explicit ICV, as appropriate. For instance, packet 842 is illustrated as having a payload P3 that has three payload parts PP1, PP2, and PP3. Packet 842 also has a header H4 with an IIF 844. IIF 844 is a set of bits which has been loaded with data to indicate that (a) P3 has three parts, (b) implicit integrity has been used for parts PP1 and PP3, and (c) an ICV has been included for part PP2. Thus, packet 842 also include MAC MP2 for part PP2. This approach may be useful for payloads with certain kinds of patterns. For instance, if the entire payload has high entropy when considered as a unit, the source device may split the payload into parts and analyze those parts to determine whether any parts have low entropy. If any do, the source device may generate and transmit ICVs only for the payload parts that have high entropy.

Alternatively, a single communication protocol may support some or all of the methodologies and formats described above, and the IIF may specify which methodology should be used for a particular packet or set of packets. Also, the algorithm of implicit integrity can be a static algorithm, or it can be negotiated for every session, for instance as part of the initial handshake. And if multiple algorithms are used, IIFs can be used to select between them.

An implicit integrity engine according to the present disclosure may ensure that patterns are not present in corrupted plaintext values, or that patterns are present only with very low probability, which is associated with a desired level of security.

Also, an implicit integrity engine according to the present disclosure may be implemented using extensions to standard cryptographic mechanisms, such as XTS-AES. In at least one embodiment, those extensions do not alter or break the confidentiality properties of encryption.

Certain example embodiments are described herein. One of ordinary skill in the art will understand that those example embodiments may easily be divided, combined, or otherwise altered to implement additional embodiments. For instance, this disclosure describes one or more embodiments in which diffusion is only applied to messages with low entropy. However, in other embodiments, diffusion may be applied regardless of whether or not a message has low entropy.

In light of the principles and example embodiments described and illustrated herein, it will be recognized that the illustrated embodiments can be modified in arrangement and detail without departing from such principles. Also, even though expressions such as "an embodiment," "one embodiment," "another embodiment," or the like are used herein, these phrases are meant to generally reference embodiment possibilities, and are not intended to limit the invention to particular embodiment configurations. As used herein, those phrases may reference the same embodiment or different embodiments, and those embodiments are combinable into other embodiments.

As described above, a device may include instructions and other data which, when accessed by a processor, cause the device to perform particular operations. For purposes of this disclosure, instructions which cause a device to perform operations may be referred to in general as "software." Software and the like may also be referred to as "control logic." Software that is used during a boot process may be referred to as "firmware," as may software that is stored in nonvolatile memory.

Software may be organized using any suitable structure or combination of structures. Accordingly, terms like "program" and "module" may be used in general to cover a broad range of software constructs, including without limitation application programs, subprograms, routines, functions, procedures, drivers, libraries, data structures, processes, microcode, and other types of software components. Also, it should be understood that a software module may include more than one component, and those components may cooperate to complete the operations of the module. Also, the operations which the software causes a device to perform may include creating an operating context, instantiating a particular data structure, etc. Any suitable operating environment and programming language (or combination of operating environments and programming languages) may be used to implement software components described herein.

A medium which contains data and which allows another component to obtain that data may be referred to as a "machine-accessible medium" or a "machine-readable medium." In one embodiment, software for multiple components is stored in one machine-readable medium. In other embodiments, two or more machine-readable media may be used to store the software for one or more components. For instance, instructions for one component may be stored in one medium, and instructions another component may be stored in another medium. Or a portion of the instructions for one component may be stored in one medium, and the rest of the instructions for that component (as well instructions for other components), may be stored in one or more other media. Similarly, software that is described above as residing on a particular device in one embodiment may, in other embodiments, reside on one or more other devices. For instance, in a distributed environment, some software may be stored locally, and some may be stored remotely. Similarly, operations that are described above as being performed on one particular device in one embodiment may, in other embodiments, be performed by one or more other devices.

Accordingly, alternative embodiments include machine-readable media containing instructions for performing the operations described herein. Such media may be referred to as program products. Such media may include, without limitation, tangible non-transitory storage components such as magnetic disks, optical disks, RAM, read-only memory (ROM), etc., as well as processors, controllers, and other components that include data storage facilities. For purposes of this disclosure, the term "ROM" may be used in general to refer to nonvolatile memory devices such as erasable programmable ROM (EPROM), electrically erasable programmable ROM (EEPROM), flash ROM, flash memory, etc.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. In some embodiments, some or all of the control logic for implementing the described operations may be implemented in hardware logic (e.g., as part of an integrated circuit chip, a programmable gate array (PGA), a field-programmable gate array (FPGA), an application-specific integrated circuit (ASIC), etc.).

For instance, in some embodiments, one, some, or all components of an implicit integrity engine (e.g., encryption modules, decryption modules, diffusion modules, inverse diffusion modules, and EPM modules) may be implemented as part of a processor, a NIC, or some other hardware component, or as parts of multiple different hardware components. And different types of devices (e.g., endpoints, Internet of things (IoT) sensors, network appliances, data centers, cloud server, etc.) may each use a different implementation.

The present teachings may be used to advantage in many different kinds of data processing systems. Example data processing systems may include, without limitation, accelerators, systems on a chip (SOCs), wearable devices, handheld devices, smartphones, telephones, entertainment devices such as audio devices, video devices, audio/video devices (e.g., televisions and set-top boxes), vehicular processing systems, personal digital assistants (PDAs), tablet computers, laptop computers, portable computers, personal computers (PCs), workstations, servers, client-server systems, distributed computing systems, supercomputers, high-performance computing systems, computing clusters, mainframe computers, mini-computers, and other devices for processing or transmitting information. Accordingly, unless explicitly specified otherwise or required by the context, references to any particular type of data processing system (e.g., a PC) should be understood as encompassing other types of data processing systems, as well. Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, ASICs, embedded computers, smart cards, and the like. For purposes of this disclosure, the term "bus" includes pathways that may be shared by more than two devices, as well as point-to-point pathways. Also, for purpose of this disclosure, the term "processor" denotes a hardware component that is capable of executing software. For instance, a processor may be implemented as a central processing unit (CPU), a processing core, or as any other suitable type of processing element. A CPU may include one or more processing cores, and a device may include one or more CPUs.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of coverage.

The following examples pertain to further embodiments.

Example A1 is a data processing system with technology to enable implicit integrity for digital communications. The data processing system comprises a processor and an implicit integrity engine responsive to the processor. The implicit integrity engine enables the data processing system to perform operations comprising (a) in response to receiving, from a source device, a communication that contains a message, automatically analyzing the communication to determine whether the message was sent with implicit integrity; (b) in response to a determination that the message was sent with implicit integrity, automatically using at least one pattern matching algorithm to analyze entropy characteristics of a plaintext version of the message; (c) automatically determining whether the message has low entropy, based on results of the pattern matching algorithm; and (e)

in response to a determination that the message does not have low entropy, automatically determining that the message has been corrupted.

Example A2 is a data processing system according to Example A1, wherein the communication that contains the message comprises a packet, and the operation of automatically analyzing the communication to determine whether the message was sent with implicit integrity comprises analyzing the packet to determine whether an implicit integrity field in the packet indicates that the packet is using implicit integrity for the message.

Example A3 is a data processing system according to Example A1, wherein the implicit integrity engine enables the data processing system to determine whether the message has been corrupted without extracting any integrity metadata for the message from the communication. Example A3 may also include the features of Example A2.

Example A4 is a data processing system according to Example A1, wherein (a) the communication comprises a first communication; (b) the message comprises a first message; and (c) the implicit integrity engine, when executed by the data processing system, enables the data processing system to perform further operations comprising (i) in response to receiving a second communication that contains a second message, automatically analyzing the second communication to determine whether the second message was sent with implicit integrity; and (ii) in response to a determination that the second message was not sent with implicit integrity, automatically extracting integrity metadata from the second communication and using the integrity metadata to determine whether the second message has been corrupted. Example A4 may also include the features of any one or more of Examples A1 through A3.

Example A5 is a data processing system according to Example A1, wherein the communication comprises a ciphertext version of the message, and the implicit integrity engine comprises a decryption module which enables the data processing system to generate a diffused version of the message, based on the ciphertext version of the message. Example A5 may also include the features of any one or more of Examples A1 through A4.

Example A6 is a data processing system according to Example A5, wherein the implicit integrity engine further comprises an inverse diffusion module which enables the data processing system to generate the plaintext version of the message, based on diffused version of the message.

Example A7 is a data processing system according to Example A6, wherein the inverse diffusion module enables the data processing system to generate the plaintext version of the message by performing operations comprising (a) using an entity reordering algorithm to generate an intermediate version of the message, based on the diffused version of the message; (b) using a column mixing (CM) algorithm to generate CM output, based on the intermediate version of the message; (c) using a row shifting (RS) algorithm to generate RS output, based on the CM output; and (d) using a substitution box (S-box) algorithm to generate the plaintext version of the message, based on an S-box key and the RS output.

Example A8 is a data processing system according to Example A7, wherein the inverse diffusion module is configured to use at least two inverse diffusion rounds to convert the diffused version of the message into the plaintext version of the message, wherein each inverse diffusion round comprises a CM round, an RS round, and an S-box round.

Example B1 is a data processing system with technology to enable implicit integrity for digital communications. The data processing system comprises a processor and an implicit integrity engine responsive to the processor. The implicit integrity engine enables the data processing system to operate as a source device and perform operations comprising (a) automatically using at least one pattern matching algorithm to analyze entropy characteristics of a plaintext version of a message, wherein the pattern matching algorithm uses at least one pattern matching test to generate at least one entropy metric for the message; (b) automatically determining whether the message has sufficiently low entropy, based on results of the pattern matching algorithm; (c) in response to a determination that the message does not have sufficiently low entropy, automatically generating integrity metadata for the message and sending the integrity metadata to a destination device; and (d) in response to a determination that the message has sufficiently low entropy, encrypting the message and sending the encrypted message to the destination device without sending any integrity metadata for the message to the destination device.

Example B2 is a data processing system according to Example B1, wherein the operation of sending the encrypted message to the destination device without sending any integrity metadata comprises sending the encrypted message to the destination device along with data indicating that the source device is not sending integrity metadata for the message to the destination device.

Example B3 is a data processing system according to Example B2, wherein the operation of sending the encrypted message to the destination device along with data indicating that the source device is not sending integrity metadata for the message to the destination device comprises (a) adding the encrypted message to a packet that has a header with an implicit integrity field; (b) configuring the implicit integrity field to indicate that the source device is not sending integrity metadata for the message to the destination device; and (c) transmitting the packet.

Example B4 is a data processing system according to Example B1, wherein the implicit integrity engine comprises a diffusion module which enables to data processing system to generate a diffused version of the message, based on the plaintext version of the message. Example B4 may also include the features of any one or more of Examples B1 through B3.

Example B5 is a data processing system according to Example B4, wherein the implicit integrity engine further comprises an encryption module which enables the data processing system to generate the encrypted message, based on the diffused version of the message.

Example B6 is a data processing system according to Example B4, wherein the implicit integrity engine is configured to generate the diffused version of the message by performing operations comprising (a) using a substitution box (S-box) algorithm to generate S-box output, based on an S-box key and the plaintext version of the message; (b) using a row shifting (RS) algorithm to generate RS output, based on the S-box output; (c) using a column mixing (CM) algorithm to generate CM output, based on the RS output; and (d) using an entity reordering algorithm to generate an intermediate version of the message, based on the CM output. Example B6 may also include the features of Example B5.

Example B7 is a data processing system according to Example B1, wherein the pattern matching algorithm comprises an extended pattern matching (EPM) algorithm that provides for multiple different pattern matching tests to generate multiple different entropy metrics for the message; and the multiple different pattern matching tests comprises at least two different tests from a group of tests comprising (a) a first test to determine a maximum number of entities in the message that are equal; (b) a second test to determine a maximum number of adjacent entities in the message that are equal; (c) a third test to determine a maximum number of entities in the message that have values from a predetermined set (SV) of special values; and (d) a fourth test to determine a sum of p entities in the message with highest value counts, where p is at least two. Example B7 may also include the features of any one or more of Examples B1 through B6.

Example C1 is a method for using implicit integrity for digital communications. The method comprises (a) in a destination device, receiving a communication that contains a message from a source device; (b) in response to receiving the communication, automatically analyzing the communication to determine whether the message was sent with implicit integrity; (c) in response to a determination that the message was sent with implicit integrity, automatically using at least one pattern matching algorithm to analyze entropy characteristics of a plaintext version of the message; (d) automatically determining whether the message has low entropy, based on results of the pattern matching algorithm; and (e) automatically determining that the message has been corrupted, in response to a determination that the message does not have low entropy.

Example C2 is a method according to Example C1, wherein the communication that contains the message comprises a packet, and the operation of automatically analyzing the communication to determine whether the message was sent with implicit integrity comprises analyzing the packet to determine whether an implicit integrity field in the packet indicates that the packet is using implicit integrity for the message.

Example C3 is a method according to Example C1, wherein the destination device determines whether the message has been corrupted without extracting any integrity metadata for the message from the communication. Example C3 may also include the features of Example C2.

Example C4 is a method according to Example C1, wherein the communication comprises a first communication, the message comprises a first message, and the method further comprises (a) in response to receiving, at the destination device, a second communication that contains a second message, automatically analyzing the second communication to determine whether the second message was sent with implicit integrity; and (b) in response to a determination that the second message was not sent with implicit integrity, automatically extracting integrity metadata from the second communication and using the integrity metadata to determine whether the second message has been corrupted. Example C4 may also include the features of any one or more of Examples C2 through C3.

Example C5 is a method according to Example C1, wherein the communication comprises a ciphertext version of the message, and the method further comprises using a decryption module to generate a diffused version of the message, based on the ciphertext version of the message. Example C5 may also include the features of any one or more of Examples C2 through C4.

Example C6 is a method according to Example C5, further comprising using an inverse diffusion module to generate the plaintext version of the message, based on diffused version of the message.

Example C7 is a method according to Example C6, wherein the operation of using an inverse diffusion module to generate the plaintext version of the message comprises (a) using an entity reordering algorithm to generate an intermediate version of the message, based on the diffused version of the message; (b) using a column mixing (CM) algorithm to generate CM output, based on the intermediate version of the message; (c) using a row shifting (RS) algorithm to generate RS output, based on the CM output; and (d) using a substitution box (S-box) algorithm to generate the plaintext version of the message, based on an S-box key and the RS output.

Example C8 is a method according to Example C7, wherein the operation of using an inverse diffusion module to generate the plaintext version of the message comprises using at least two inverse diffusion rounds to convert the diffused version of the message into the plaintext version of the message, wherein each inverse diffusion round comprises a CM round, an RS round, and an S-box round.

Example D1 is a method for using implicit integrity for digital communications. The method comprises (a) in a source device, automatically using at least one pattern matching algorithm to analyze entropy characteristics of a plaintext version of a message, wherein the pattern matching algorithm uses at least one pattern matching test to generate at least one entropy metric for the message; (b) automatically determining whether the message has sufficiently low entropy, based on results of the pattern matching algorithm; (c) in response to a determination that the message does not have sufficiently low entropy, automatically generating integrity metadata for the message and sending the integrity metadata to a destination device; and (d) in response to a determination that the message has sufficiently low entropy, encrypting the message and sending the encrypted message to the destination device without sending any integrity metadata for the message to the destination device.

Example D2 is a method according to Example D1, wherein the operation of sending the encrypted message to the destination device without sending any integrity metadata comprises sending the encrypted message to the destination device along with data indicating that the source device is not sending integrity metadata for the message to the destination device.

Example D3 is a method according to Example D2, wherein the operation of sending the encrypted message to the destination device along with data indicating that the source device is not sending integrity metadata for the message to the destination device comprises (a) adding the encrypted message to a packet that has a header with an implicit integrity field; (b) configuring the implicit integrity field to indicate that the source device is not sending integrity metadata for the message to the destination device; and (c) transmitting the packet.

Example D4 is a method according to Example D1, further comprising, in response to the determination that the message has sufficiently low entropy, using a diffusion module to generate a diffused version of the message, based on the plaintext version of the message. Example D4 may also include the features of any one or more of Examples D2 through D3.

Example D5 is a method according to Example D4, wherein the operation of encrypting the message comprises using an encryption module to generate the encrypted message, based on the diffused version of the message.

Example D6 is a method according to Example D4, wherein the operation of using a diffusion module to generate a diffused version of the message comprises (a) using a substitution box (S-box) algorithm to generate S-box output, based on an S-box key and the plaintext version of the message; (b) using a row shifting (RS) algorithm to generate RS output, based on the S-box output; (c) using a column mixing (CM) algorithm to generate CM output, based on the RS output; and (d) using an entity reordering algorithm to generate an intermediate version of the message, based on the CM output. Example D6 may also include the features of Example D5.

Example D7 is a method according to Example D1, wherein the pattern matching algorithm comprises an extended pattern matching (EPM) algorithm that provides for multiple different pattern matching tests to generate multiple different entropy metrics for the message; and the multiple different pattern matching tests comprises at least two different tests from a group of tests comprising (a) a first test to determine a maximum number of entities in the message that are equal; (b) a second test to determine a maximum number of adjacent entities in the message that are equal; (c) a third test to determine a maximum number of entities in the message that have values from a predetermined set (SV) of special values; and (d) a fourth test to determine a sum of p entities in the message with highest value counts, where p is at least two. Example D7 may also include the features of any one or more of Examples D2 through D6.

Example E is at least one machine-readable medium comprising computer instructions for using implicit integrity for digital communications. The computer instructions, in response to being executed in a device, enable the device to perform a method according to any of Examples C1 through C8 and D1 through D7.

Example F is a data processing system with technology for using implicit integrity for digital communications. The data processing system comprises a processing element; at least one machine-readable medium responsive to the processing element; and computer instructions stored at least partially in the at least one machine-accessible medium, wherein the computer instructions, in response to being executed, enable the data processing system to perform a method according to any of Examples C1 through C8 and D1 through D7.

Example G is a data processing system with technology for using implicit integrity for digital communications. The data processing system comprises means for performing the method of any one of Examples C1 through C8 and D1 through D7.

What is claimed is:

1. A data processing system with technology to enable implicit integrity to be used for digital communications, the data processing system comprising:
    a hardware processor; and
    an implicit integrity engine responsive to the processor, wherein the implicit integrity engine enables the data processing system to operate as a source device and perform operations comprising:
        automatically using a pattern matching algorithm to analyze entropy characteristics of a plaintext version of a message, wherein the pattern matching algorithm uses at least one pattern matching test to generate at least one entropy metric for the message;
        automatically determining whether the message has low entropy, based on results of the pattern matching algorithm and a predetermined entropy threshold;
        in response to a determination that the message does not have the low entropy, automatically generating cyphertext based on the message, generating integrity metadata based on the cyphertext, and sending the cyphertext and the integrity metadata to a destination device; and
        in response to a determination that the message has the low entropy, encrypting the message and sending the encrypted message to the destination device without sending any integrity metadata for the message to the destination device.

2. The data processing system according to claim 1, wherein the operation of sending the encrypted message to the destination device without sending any integrity metadata comprises:
    sending the encrypted message to the destination device along with data indicating that the source device is not sending integrity metadata for the message to the destination device.

3. The data processing system according to claim 2, wherein the operation of sending the encrypted message to the destination device along with data indicating that the source device is not sending integrity metadata for the message to the destination device comprises:
    adding the encrypted message to a packet that has a header with an implicit integrity field;
    configuring the implicit integrity field to indicate that the source device is not sending integrity metadata for the message to the destination device; and
    transmitting the packet.

4. The data processing system according to claim 1, wherein the implicit integrity engine comprises:
    a diffusion module which enables to data processing system to generate a diffused version of the message, based on the plaintext version of the message.

5. The data processing system according to claim 4, wherein the implicit integrity engine further comprises:
    an encryption module which enables the data processing system to generate the encrypted message, based on the diffused version of the message.

6. The data processing system according to claim 4, wherein the implicit integrity engine is configured to generate the diffused version of the message by performing operations comprising:
    using a substitution box (S-box) algorithm to generate S-box output, based on an S-box key and the plaintext version of the message;
    using a row shifting (RS) algorithm to generate RS output, based on the S-box output;
    using a column mixing (CM) algorithm to generate CM output, based on the RS output; and
    using an entity reordering algorithm to generate an intermediate version of the message, based on the CM output.

7. The data processing system according to claim 1, wherein:
    the pattern matching algorithm comprises an extended pattern matching (EPM) algorithm that provides for multiple different pattern matching tests to generate multiple different entropy metrics for the message; and
    the multiple different pattern matching tests comprises at least two different tests from a group of tests comprising:
        a first test to determine a maximum number of entities in the message that are equal;
        a second test to determine a maximum number of adjacent entities in the message that are equal;
        a third test to determine a maximum number of entities in the message that have values from a predetermined set (SV) of special values; and
        a fourth test to determine a sum of p entities in the message with highest value counts, where p is at least two.

8. A method for using implicit integrity for digital communications, the method comprising:
- in a source device, automatically using a pattern matching algorithm to analyze entropy characteristics of a plaintext version of a message, wherein the pattern matching algorithm uses at least one pattern matching test to generate at least one entropy metric for the message;
- automatically determining whether the message has low entropy, based on results of the pattern matching algorithm and a predetermined entropy threshold;
- in response to a determination that the message does not have the low entropy, automatically generating cyphertext based on the message, generating integrity metadata based on the cyphertext, and sending the cyphertext and the integrity metadata to a destination device; and
- in response to a determination that the message has the low entropy, encrypting the message and sending the encrypted message to the destination device without sending any integrity metadata for the message to the destination device.

9. The method according to claim 8, wherein the operation of sending the encrypted message to the destination device without sending any integrity metadata comprises:
- sending the encrypted message to the destination device along with data indicating that the source device is not sending integrity metadata for the message to the destination device.

10. The method according to claim 9, wherein the operation of sending the encrypted message to the destination device along with data indicating that the source device is not sending integrity metadata for the message to the destination device comprises:
- adding the encrypted message to a packet that has a header with an implicit integrity field;
- configuring the implicit integrity field to indicate that the source device is not sending integrity metadata for the message to the destination device; and
- transmitting the packet.

11. The method according to claim 8, further comprising:
- in response to the determination that the message has the low entropy, using a diffusion module to generate a diffused version of the message, based on the plaintext version of the message.

12. The method according to claim 11, wherein the operation of encrypting the message comprises using an encryption module to generate the encrypted message, based on the diffused version of the message.

13. The method according to claim 8, wherein:
- the pattern matching algorithm comprises an extended pattern matching (EPM) algorithm that provides for multiple different pattern matching tests to generate multiple different entropy metrics for the message; and
- the multiple different pattern matching tests comprises at least two different tests from a group of tests comprising:
  - a first test to determine a maximum number of entities in the message that are equal;
  - a second test to determine a maximum number of adjacent entities in the message that are equal;
  - a third test to determine a maximum number of entities in the message that have values from a predetermined set (SV) of special values; and
  - a fourth test to determine a sum of p entities in the message with highest value counts, where p is at least two.

* * * * *